(12) United States Patent
Southward et al.

(10) Patent No.: US 8,246,923 B2
(45) Date of Patent: Aug. 21, 2012

(54) HIGH PD CONTENT DIESEL OXIDATION CATALYSTS WITH IMPROVED HYDROTHERMAL DURABILITY

(75) Inventors: Barry W. L. Southward, Frankfurt am Main (DE); John G. Nunan, Tulsa, OK (US)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 12/467,771

(22) Filed: May 18, 2009

(65) Prior Publication Data

US 2010/0290964 A1 Nov. 18, 2010

(51) Int. Cl.
*B01D 50/00* (2006.01)
*B01D 53/34* (2006.01)
*B01D 53/56* (2006.01)
*B01D 53/94* (2006.01)
*B01J 8/02* (2006.01)
*B01J 23/00* (2006.01)
*C01B 21/00* (2006.01)
*C01B 23/00* (2006.01)
*C01B 25/00* (2006.01)
*C01B 31/00* (2006.01)
*C01B 33/00* (2006.01)
*C01B 35/00* (2006.01)

(52) U.S. Cl. ......... 423/213.5; 422/180; 502/66; 502/73; 502/74; 502/302; 502/327; 502/328; 502/332; 502/333; 502/339; 502/349; 502/350; 502/351; 502/355; 502/415; 502/439; 502/527.12; 502/527.13

(58) Field of Classification Search .......... 502/66, 502/74, 302, 327, 328, 332, 333, 339, 349, 502/350, 351, 355, 415, 439, 527.12, 527.13; 423/213.5; 422/180

See application file for complete search history.

(56) References Cited

U.S. PATENT DOCUMENTS

| | | | |
|---|---|---|---|
| 2,125,231 | A | 7/1938 | Hurst |
| 4,740,292 | A | 4/1988 | Chen et al. |
| 4,961,917 | A | 10/1990 | Byrne |
| 5,010,051 | A | 4/1991 | Rudy |
| 5,332,554 | A | 7/1994 | Yasaki |
| 5,371,056 | A | 12/1994 | Leyrer et al. |
| 5,439,865 | A | 8/1995 | Abe et al. |

(Continued)

FOREIGN PATENT DOCUMENTS

DE 39 40 758 6/1991

(Continued)

OTHER PUBLICATIONS

Abdennour Bourane, et al., "Oxidation of CO on a PT/AL2O3 Catalyst: From the Surface Elementary Steps to Light-Off Tests, V. Experimental and Kinetic Model for Light-Off Tests in Excess of O2", Journal of Catalysis vol. 222 (2004), pp. 499-510.

(Continued)

*Primary Examiner* — Cam N. Nguyen
(74) *Attorney, Agent, or Firm* — Smith, Gambrell & Russell, LLP

(57) ABSTRACT

There is described Pd enriched diesel oxidation catalysts and their application as catalysts for the oxidation of CO and HC emissions from a compression ignition/diesel engine. The catalysts are characterized by increased performance and hydrothermal durability these goals being achieved by employing a layered design to eliminate low temperature catalyst quenching by toxic HC species in the exhaust stream.

24 Claims, 18 Drawing Sheets

U.S. PATENT DOCUMENTS

| | | | |
|---|---|---|---|
| 5,462,907 A | 10/1995 | Farrauto et al. | |
| 5,525,307 A | 6/1996 | Yasaki | |
| 5,597,771 A * | 1/1997 | Hu et al. | 502/304 |
| 5,627,124 A | 5/1997 | Farrauto et al. | |
| 5,744,103 A | 4/1998 | Yamada et al. | |
| 5,824,621 A | 10/1998 | Abe et al. | |
| 5,928,981 A | 7/1999 | Leyrer et al. | |
| 6,087,298 A | 7/2000 | Sung et al. | |
| 6,153,160 A | 11/2000 | Voss et al. | |
| 6,274,107 B1 | 8/2001 | Yavuz et al. | |
| 6,342,465 B1 | 1/2002 | Klein et al. | |
| 6,375,910 B1 | 4/2002 | Deeba et al. | |
| 6,756,336 B2 | 6/2004 | Kasahara et al. | |
| 6,764,665 B2 * | 7/2004 | Deeba et al. | 423/239.1 |
| 6,767,855 B2 | 7/2004 | Kasahara et al. | |
| 6,805,849 B1 | 10/2004 | Andreasson et al. | |
| 6,843,971 B2 | 1/2005 | Schäfer-Sindlinger et al. | |
| 6,914,026 B2 | 7/2005 | Tran et al. | |
| 7,005,116 B2 | 2/2006 | Schäfer-Sindlinger et al. | |
| 7,022,646 B2 * | 4/2006 | Li | 502/339 |
| 7,071,141 B2 | 7/2006 | Gandhi et al. | |
| 7,078,004 B2 | 7/2006 | Voss et al. | |
| 7,084,086 B2 | 8/2006 | Kasahara et al. | |
| 7,210,288 B2 | 5/2007 | Bandl-Konrad et al. | |
| 7,313,911 B2 | 1/2008 | Pfeifer et al. | |
| 7,329,629 B2 * | 2/2008 | Gandhi et al. | 502/325 |
| 7,374,729 B2 * | 5/2008 | Chen et al. | 422/177 |
| 7,501,098 B2 * | 3/2009 | Chen et al. | 422/177 |
| 7,506,504 B2 | 3/2009 | Kumar | |
| 7,517,826 B2 * | 4/2009 | Fujdala et al. | 502/60 |
| 7,550,124 B2 * | 6/2009 | Chen et al. | 423/213.2 |
| 7,576,031 B2 | 8/2009 | Beutel et al. | |
| 7,749,472 B2 | 7/2010 | Chen et al. | |
| 7,772,151 B2 | 8/2010 | Li et al. | |
| 7,795,172 B2 | 9/2010 | Foong et al. | |
| 7,824,639 B2 | 11/2010 | Moroz et al. | |
| 7,842,643 B2 | 11/2010 | Yabuzaki et al. | |
| 7,846,865 B2 | 12/2010 | Yamato et al. | |
| 7,875,250 B2 | 1/2011 | Nunan | |
| 7,875,573 B2 | 1/2011 | Beutel et al. | |
| 7,906,454 B2 | 3/2011 | Wolf et al. | |
| 7,923,408 B2 | 4/2011 | Takahashi et al. | |
| 7,947,238 B2 | 5/2011 | Deeba | |
| 7,976,784 B2 | 7/2011 | Liu et al. | |
| 7,977,275 B2 | 7/2011 | Pfeifer et al. | |
| 7,998,896 B2 | 8/2011 | Kitamura et al. | |
| 2002/0039550 A1 | 4/2002 | Schäfer-Sindlinger et al. | |
| 2002/0048542 A1 * | 4/2002 | Deeba et al. | 423/239.1 |
| 2003/0021745 A1 | 1/2003 | Chen | |
| 2003/0086851 A1 * | 5/2003 | Dou | 423/239.1 |
| 2003/0103886 A1 * | 6/2003 | Dou | 423/239.1 |
| 2003/0108465 A1 | 6/2003 | Voss et al. | |
| 2003/0158037 A1 * | 8/2003 | Foong et al. | 502/328 |
| 2003/0175192 A1 | 9/2003 | Hu et al. | |
| 2004/0001781 A1 | 1/2004 | Kumar et al. | |
| 2004/0110628 A1 | 6/2004 | Kasahara | |
| 2004/0151645 A1 * | 8/2004 | Li | 423/213.5 |
| 2004/0198595 A1 * | 10/2004 | Chen | 502/328 |
| 2004/0254061 A1 * | 12/2004 | Dou | 502/71 |
| 2005/0045405 A1 | 3/2005 | Yugo et al. | |
| 2005/0164879 A1 * | 7/2005 | Chen | 502/328 |
| 2005/0196333 A1 | 9/2005 | Schafer-Sindlinger et al. | |
| 2005/0227867 A1 * | 10/2005 | Chen et al. | 502/325 |
| 2005/0266988 A1 | 12/2005 | Doumeki et al. | |
| 2006/0153761 A1 | 7/2006 | Bandl-Konrad et al. | |
| 2007/0051096 A1 | 3/2007 | Pfeifer et al. | |
| 2007/0089403 A1 | 4/2007 | Pfeifer et al. | |
| 2007/0175208 A1 | 8/2007 | Bandl-Konrad et al. | |
| 2007/0277507 A1 | 12/2007 | Yan | |
| 2008/0020922 A1 | 1/2008 | Li et al. | |
| 2008/0038172 A1 * | 2/2008 | Chen et al. | 423/213.2 |
| 2008/0042104 A1 * | 2/2008 | Chen et al. | 252/372 |
| 2008/0044329 A1 * | 2/2008 | Chen et al. | 423/213.2 |
| 2008/0044330 A1 * | 2/2008 | Chen et al. | 423/213.5 |
| 2008/0045405 A1 | 2/2008 | Beutel | |
| 2008/0066458 A1 * | 3/2008 | Toyoda et al. | 60/299 |
| 2008/0119353 A1 | 5/2008 | Jia et al. | |
| 2008/0120970 A1 * | 5/2008 | Hilgendorff et al. | 60/299 |
| 2008/0286184 A1 * | 11/2008 | Ando et al. | 423/213.5 |
| 2009/0129995 A1 | 5/2009 | Pfeifer et al. | |
| 2009/0151341 A1 | 6/2009 | Kim et al. | |
| 2009/0169451 A1 | 7/2009 | Andreasson et al. | |
| 2009/0193796 A1 | 8/2009 | Wei et al. | |
| 2009/0239745 A1 * | 9/2009 | Yamato et al. | 502/339 |
| 2009/0257933 A1 * | 10/2009 | Chen et al. | 423/213.2 |
| 2009/0320457 A1 * | 12/2009 | Wan | 60/299 |
| 2010/0048384 A1 * | 2/2010 | Fujdala et al. | 502/66 |
| 2010/0058746 A1 | 3/2010 | Pfeifer et al. | |
| 2010/0062930 A1 * | 3/2010 | Sato et al. | 502/339 |
| 2010/0095658 A1 | 4/2010 | Spurk | |
| 2010/0111796 A1 * | 5/2010 | Caudle et al. | 423/239.2 |
| 2010/0166629 A1 | 7/2010 | Deeba | |
| 2010/0180581 A1 | 7/2010 | Grubert et al. | |
| 2010/0180582 A1 | 7/2010 | Mueller-Stach et al. | |
| 2010/0183490 A1 | 7/2010 | Hoke et al. | |
| 2010/0221161 A1 | 9/2010 | Schneider et al. | |
| 2010/0257843 A1 | 10/2010 | Hoke | |
| 2011/0099975 A1 | 5/2011 | Bailey | |
| 2011/0120093 A1 | 5/2011 | Eckhoff | |

FOREIGN PATENT DOCUMENTS

| | | |
|---|---|---|
| DE | 44 35 073 | 4/1995 |
| DE | 196 14 540 | 10/1997 |
| DE | 197 34 627 | 1/1999 |
| DE | 197 53 738 | 6/1999 |
| DE | 103 08 288 | 9/2004 |
| DE | 10 2004 040549 | 2/2006 |
| DE | 10 2007 060 623 | 6/2009 |
| EP | 0 385 164 | 9/1990 |
| EP | 0 427 970 | 5/1991 |
| EP | 0 800 856 A2 | 10/1997 |
| EP | 1 046 423 | 10/2000 |
| EP | 1 054 722 B1 | 11/2000 |
| EP | 1 072 764 A1 | 1/2001 |
| EP | 1 147 801 | 10/2001 |
| EP | 1 495 804 | 1/2005 |
| EP | 2 112 339 | 10/2009 |
| JP | 63-084635 | 4/1988 |
| WO | 95/35152 | 12/1995 |
| WO | 01/02083 | 1/2001 |
| WO | 01/74476 | 10/2001 |
| WO | 02/14657 | 2/2002 |
| WO | 03/035256 | 5/2003 |
| WO | 2004/061278 | 7/2004 |
| WO | 2004/071646 A2 | 8/2004 |
| WO | 2004/076829 | 9/2004 |
| WO | 2005/031132 | 4/2005 |
| WO | 2006/021336 | 3/2006 |
| WO | 2007/048971 | 5/2007 |
| WO | 2008/101585 | 8/2008 |
| WO | 2010/083357 | 7/2010 |

OTHER PUBLICATIONS

R. Burch, et al., "An Investigation Into the Reactivity, Deactivation, and in Situ Regeneration of PT-Based Catalysts for the Selective Reduction of NOx Under Lean Burn Conditions", Journal of Catalysis 182, pp. 234-243 (1999).

R. Burch, et. al., "Selective Reduction of Nitrogen Oxides by Hydrocarbons Under Lean-Burn Conditions Using Supported Platinum Group Metal Catalysts", Catalysis Today vol. 26 (1995), pp. 185-206.

M. Chen, et al., "Morphology and Composition of PT-PD Alloy Crystallites on SiO2 in Reactive Atmospheres", Journal of Catalysis vol. 56, pp. 198-218 (1979).

Ronald M. Heck, et al., "Automobile Exhaust Catalysts", Applied Catalysis A: General vol. 221 (2001), pp. 443-457.

J.A.A. van den Tillaart, et al., "Effect of Support Oxide and Noble Metal Precursor on the Activity of Automative Diesel Catalysts", Applied Catalysis B: Environmental vol. 10 (1996), pp. 53-68.

Manufacturers of Emission Controls Association (MECA), "The Impact of Sulfur in Diesel Fuel on Catalyst Emission Control Technology", Mar. 15, 1999, pp. 1-25.

A. Morlang, et al., "Bimetallic PT/PD Diesel Oxidation Catalysts Structural Characterisation and Catalytic Behaviour", Applied Catalysis B: Environmental vol. 60 (2005), pp. 191-199.

Official Journal of the European Union, "Regulations", Regulation (EC) No. 715/2007 of the European Parliament and of the Council of Jun. 20, 2007 on type approval of motor vehicles with respect to emissions from light passenger and commercial vehicles (Euro 5 and Euro 6) and on access to vehicle repair and maintenance information; pp. L171/1-16.

Martyn V. Twigg, "Progress and Future Challenges in Controlling Automotive Exhaust Gas Emissions", Applied Catalysis B: Environmental, (2007) vol. 70 pp. 1-4.

Written Opinion for PCT/EP2009/002101, mailed Jun. 15, 2009.

PCT Notification Concerning Transmittal of Copy of International Preliminary Examination Report on Patentability (Form PCT/IB/326) mailed Dec. 2, 2010 for Application No. PCT/EP2008/008995.

PCT International Preliminary Report on Patentability (Form PCT/IB/373) issued Nov. 23, 2010 for Application No. PCT/EP2008/008995 (in English language).

English translation of the PCT Written Opinion of the International Searching Authority (Form/ISA/237) issued Nov. 23, 2010 for Application No. PCT/EP2008/008995 w/ English language translation.

International Search report for Application No. PCT/EP2008/008995 dated Feb. 17, 2009 (in English language).

Gerard Tuenter, et al., "Kinetics and Mechanism of the $NO_x$ Reduction with $NH_3$ on $V_2O_5$-$WO_3$-$TiO_2$ Catalyst", Ind. Eng. Chem. Prod. Res. Dev., 1986, 25, pp. 633-636.

Stephan Liebsch, "Katalytische Partikeloxidation im Kontext von Harnstoff-SCR and Partikelkonfektionierung", TU Dresden, 2004, pp. 1-179.

Konieczny et al., "Pre-Turbocharger-Catalyst-Catalytic performances on an Euro V type Diesel engine and robust design development", 2008-01-0768, SAE World Congress, Detroit, Michigan, Apr. 14-17, 2008.

International Application No. PCT/EP2008/00631 filed on Jan. 28, 2008 (published as WO/2008/101585 filed Aug. 28, 2008).

International Search Report for PCT/EP2009/002101 mailed Jun. 15, 2009.

International Search Report mailed in PCT/EP2010/002904, dated Aug. 30, 2010.

* cited by examiner

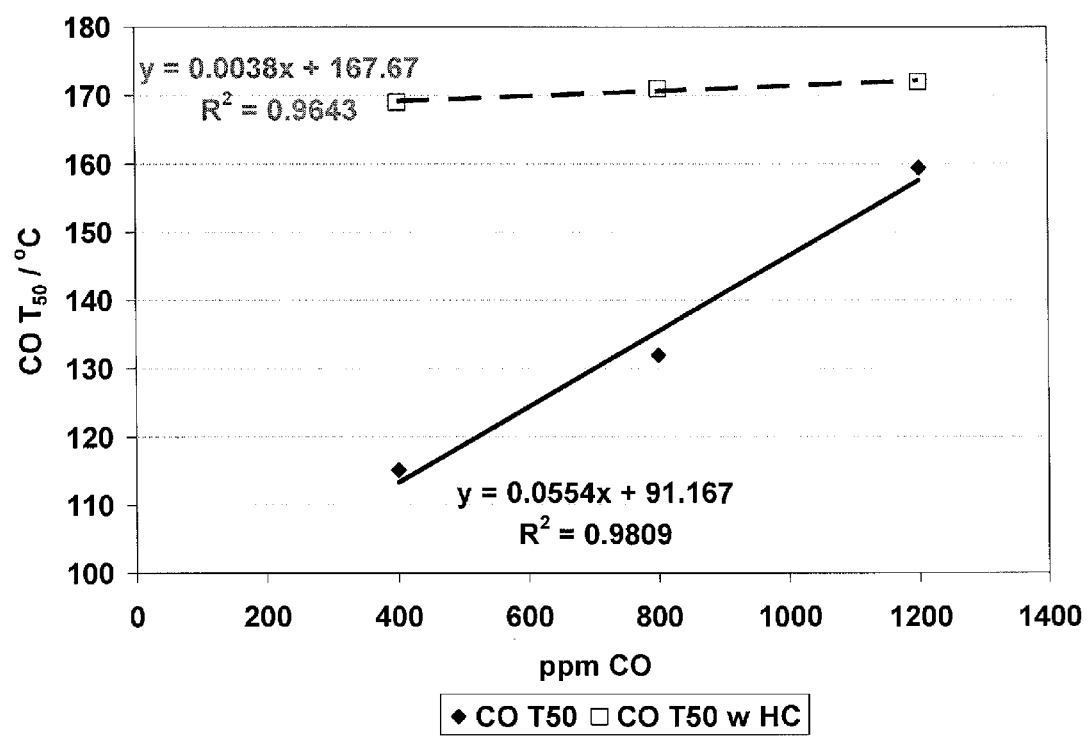
Figure 1: Impact of HC on CO light-off (1*3" core, ex 650 °C 10% steam / air for 20h)

Figure 2: Light-off and Quench for reference DOC 120 @ 3:1. (1*3" core, aged 650 °C 10% steam / air / 20h).
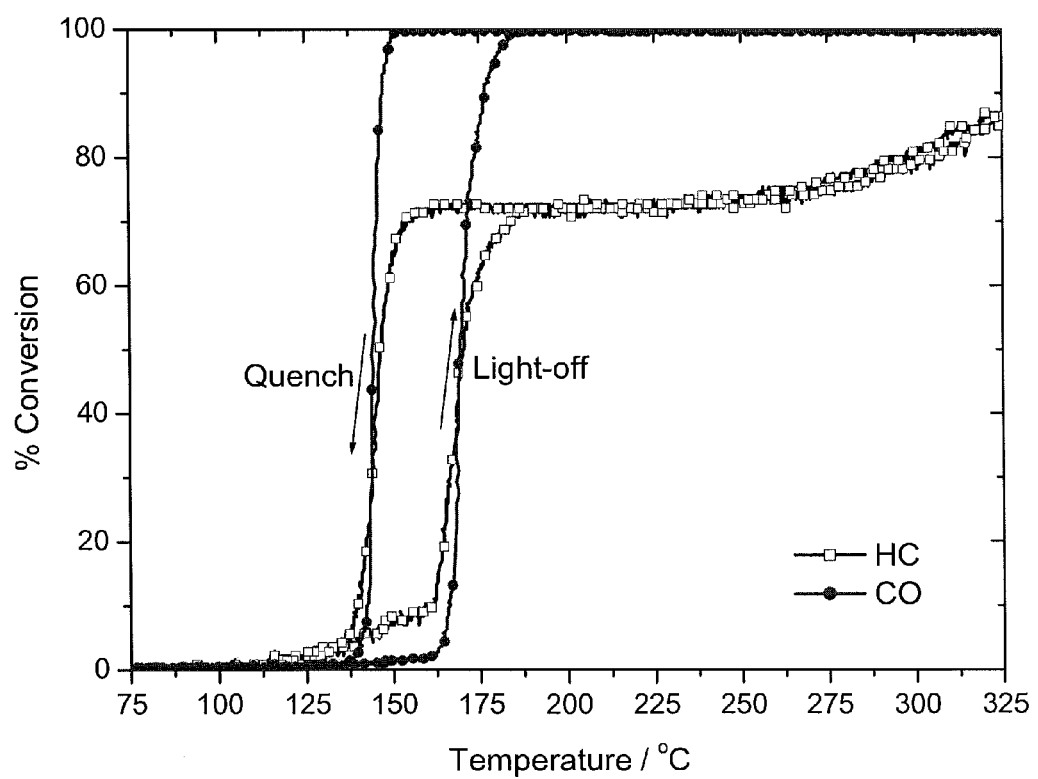

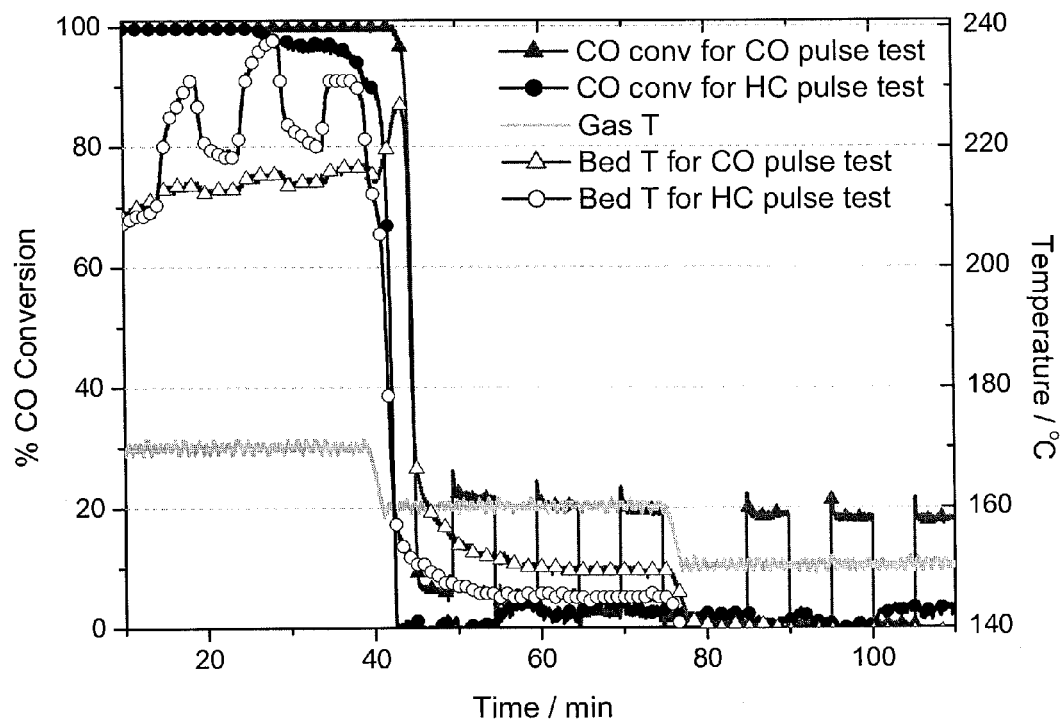
Figure 3: Impact of CO or HC pulses on the isothermal activity aged reference DOC.

Figure 4: Comparison of Light-off and Quench performance for Catalyst A (1*3" core, aged 650 °C 10% steam / air / 20h).
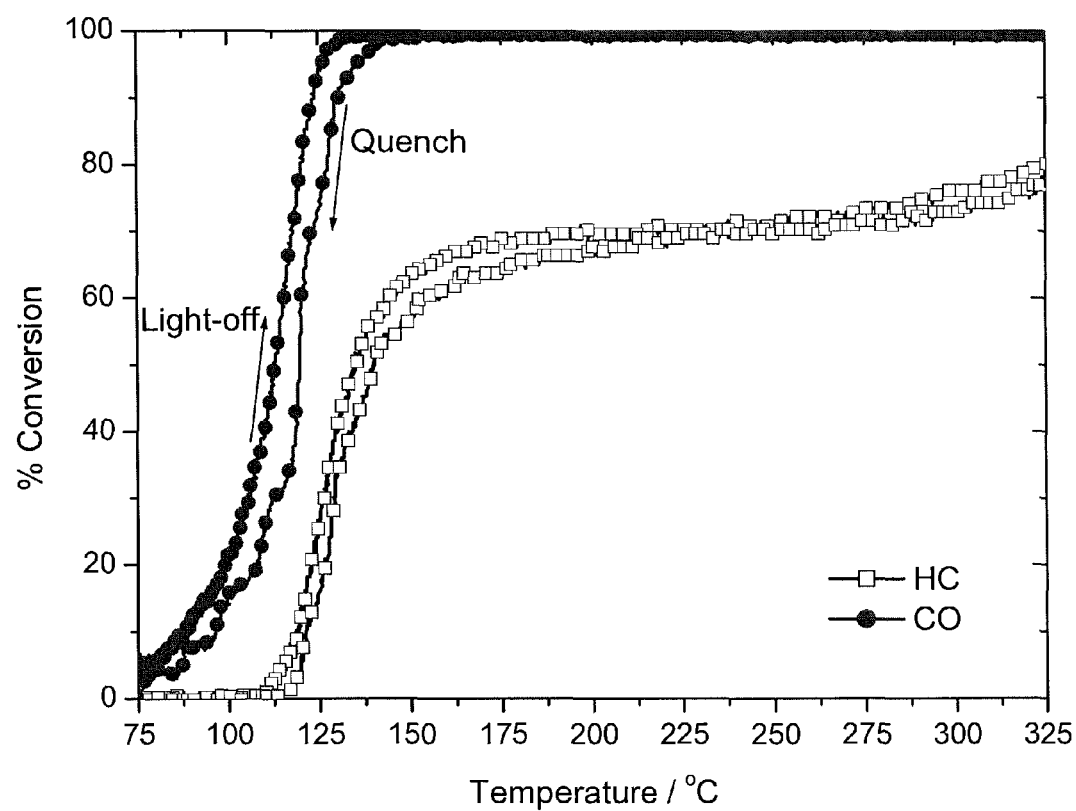

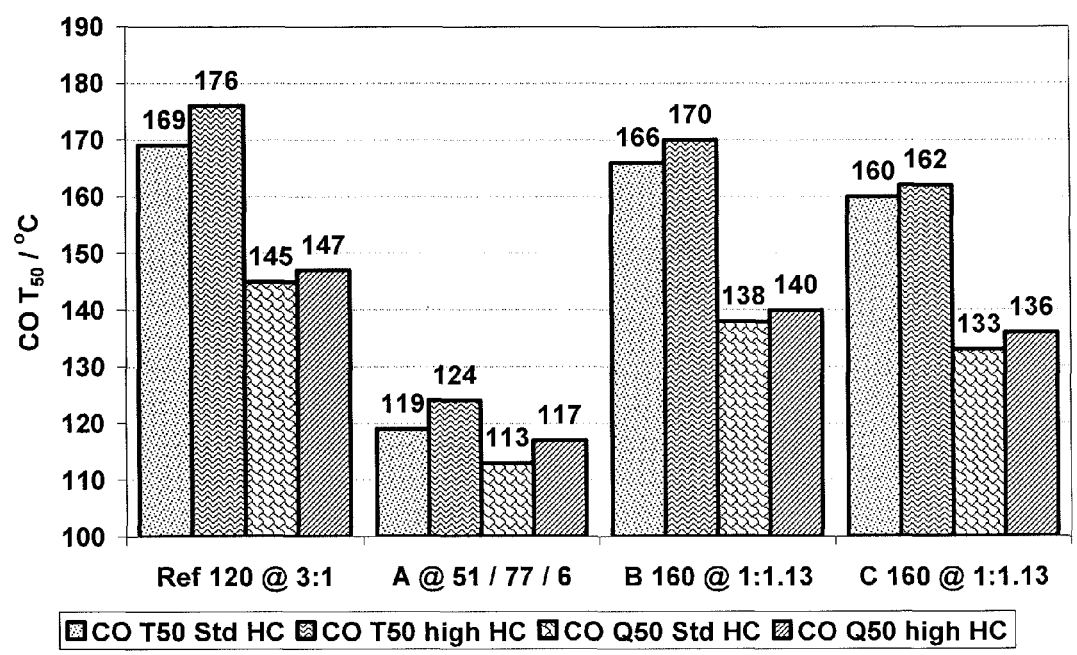
Figure 5: Performance of DOC after aging, 1*3" core, ex 650 °C 10% steam / air for 20h.

Figure 6: Impact of CO or HC pulses on the isothermal activity for aged DOC sample B.
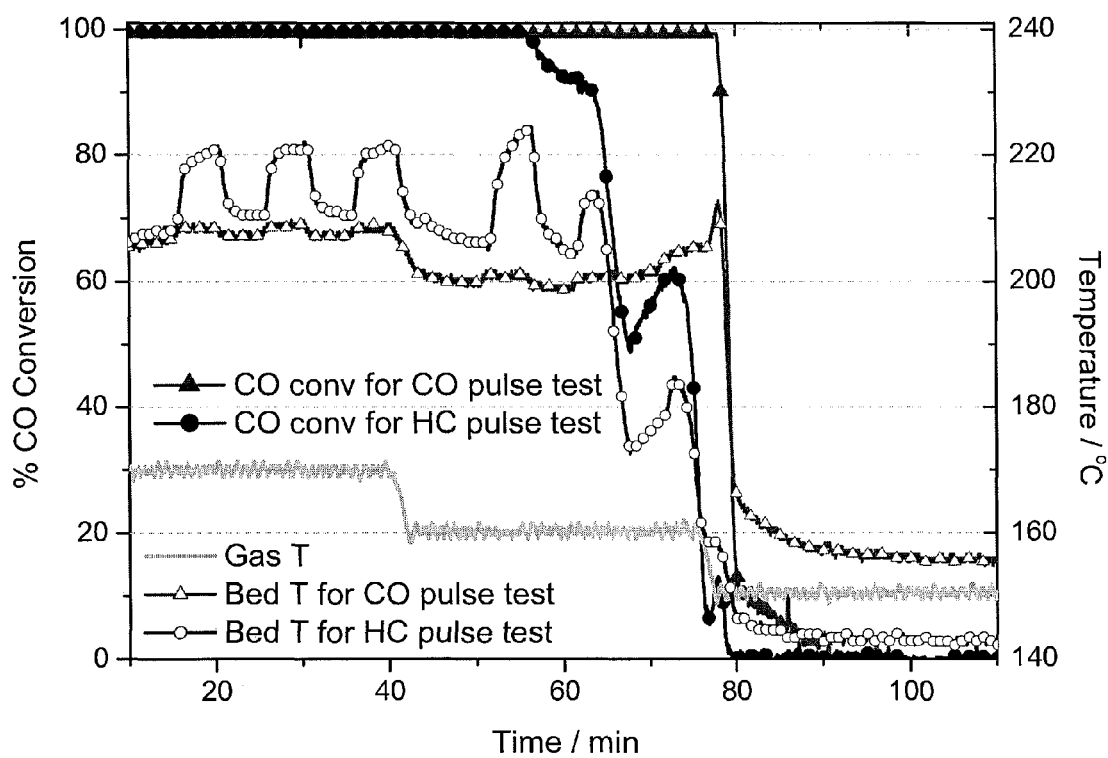

Figure 7: Impact of CO or HC pulses on the isothermal activity for aged DOC sample C.
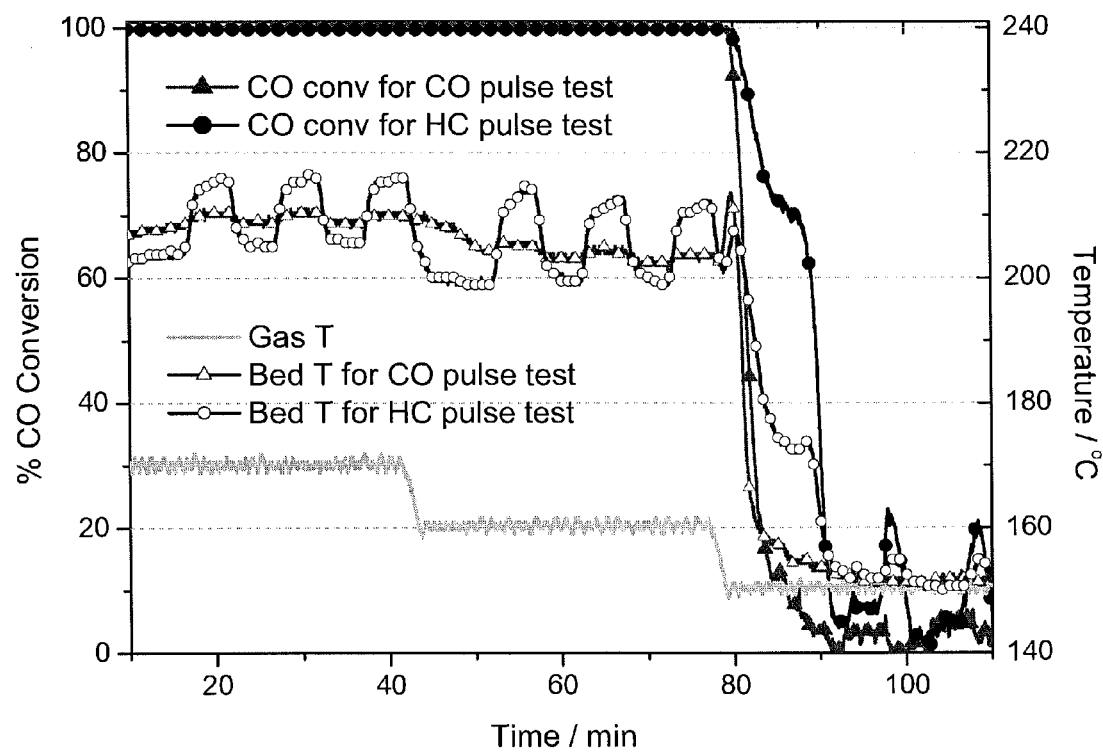

Figure 8: Engine Dyno performance of reference versus high Pd DOCs.
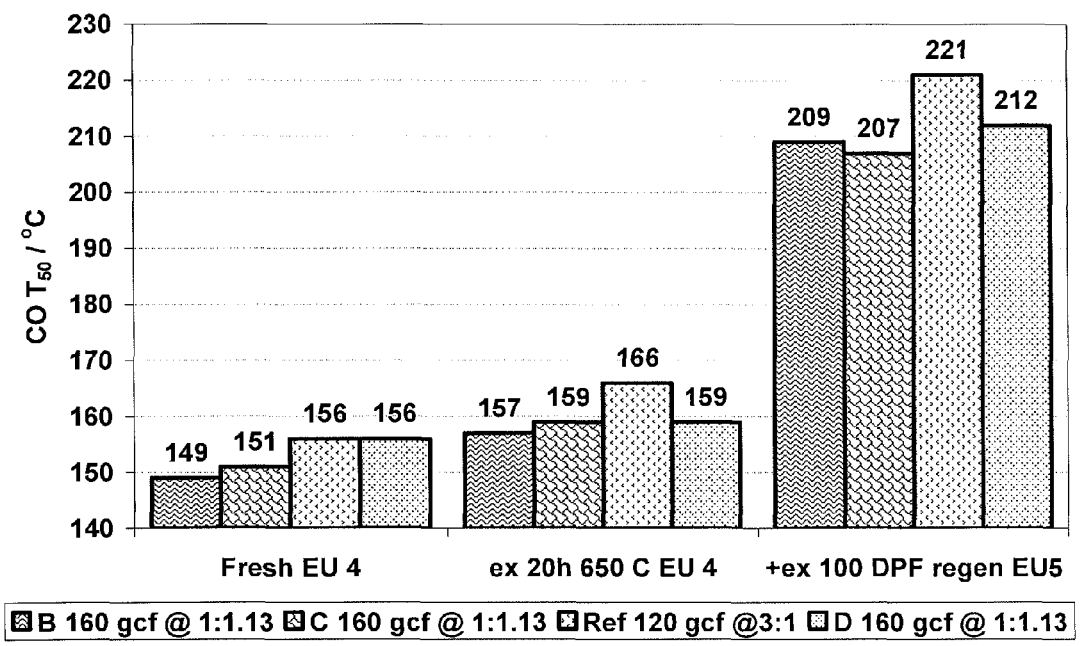

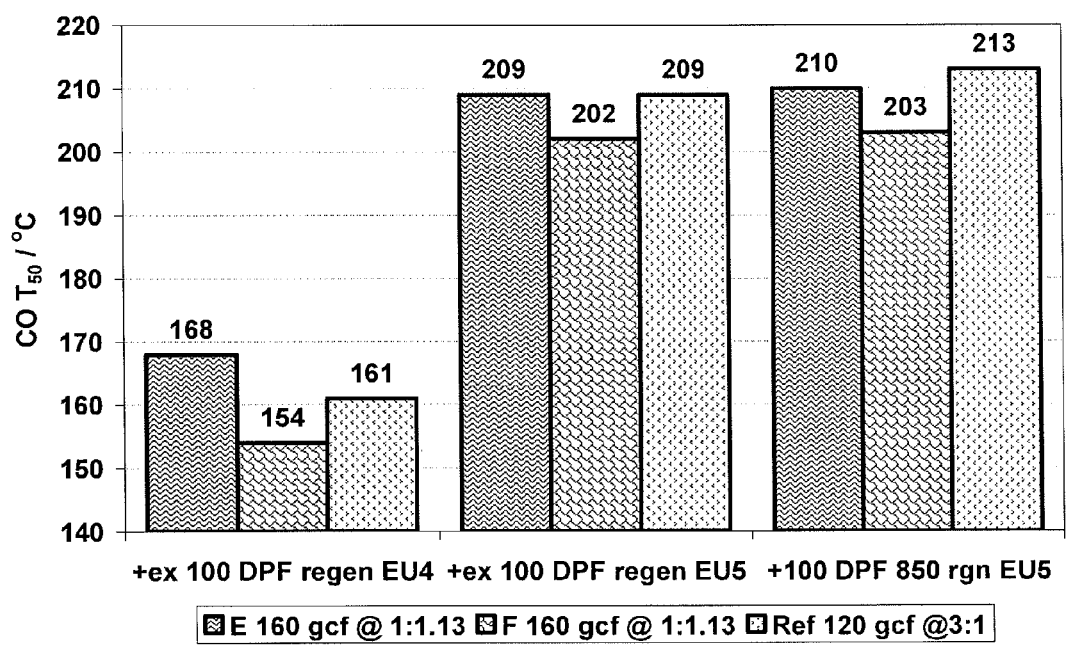
Figure 9: Engine Dyno performance of reference versus high Pd DOCs.

Figure 10: Engine Dyno Performance for reference vs high Pd DOC. Impact of Pd load / ratio.
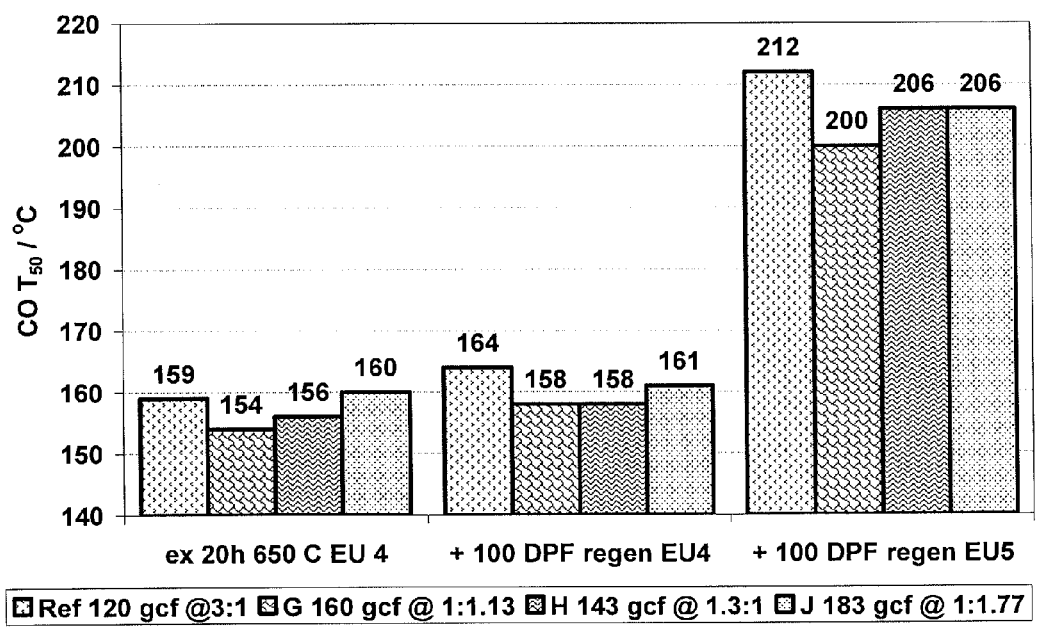

Figure 11: Vehicle performance of DOC technologies ex Figure 10.
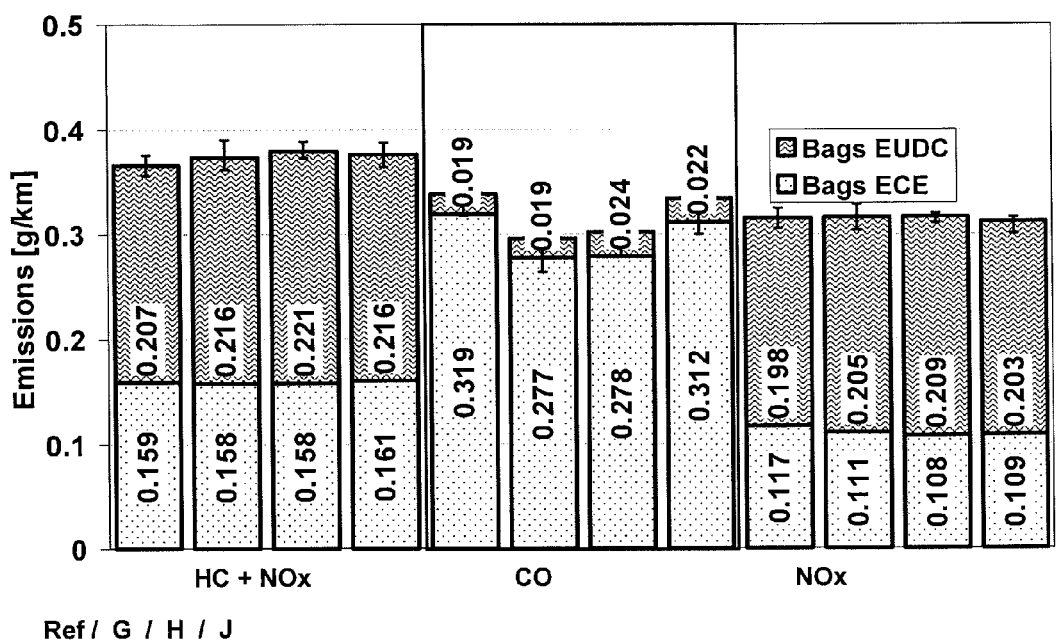

Figure 12: Engine Dyno Performance for reference vs high Pd DOCs. Impact of Pt:Pd distributions in Pass 1 / 2.
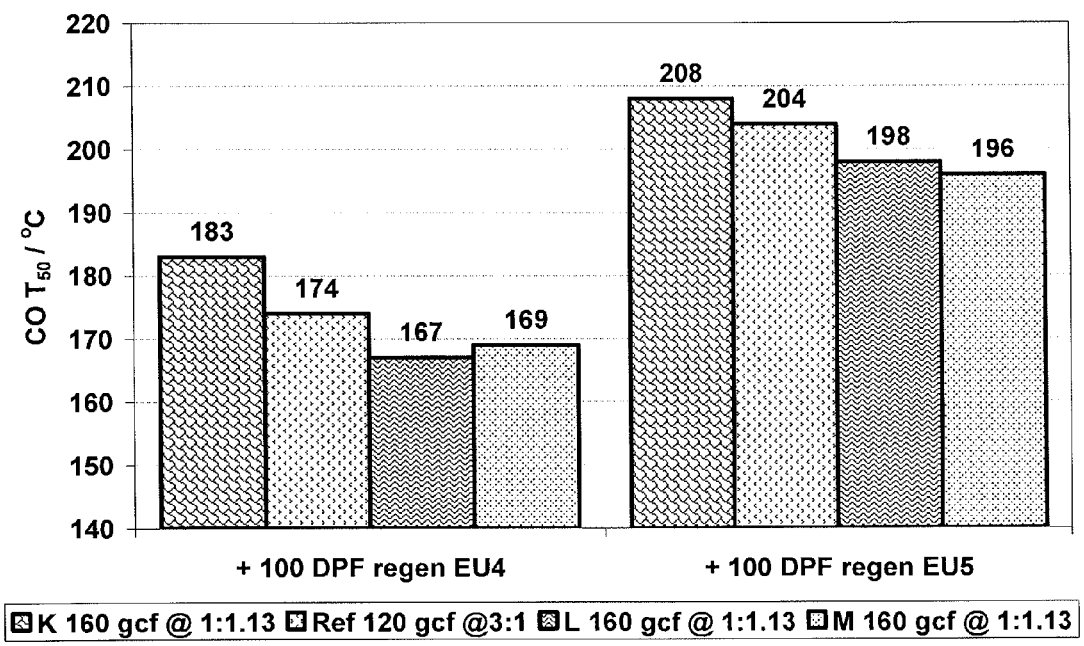

Figure 13: Engine Dyno Performance of reference DOC vs 50% zoned high Pd DOC. Impact of Pd in pass 1 vs pass 2 zone.
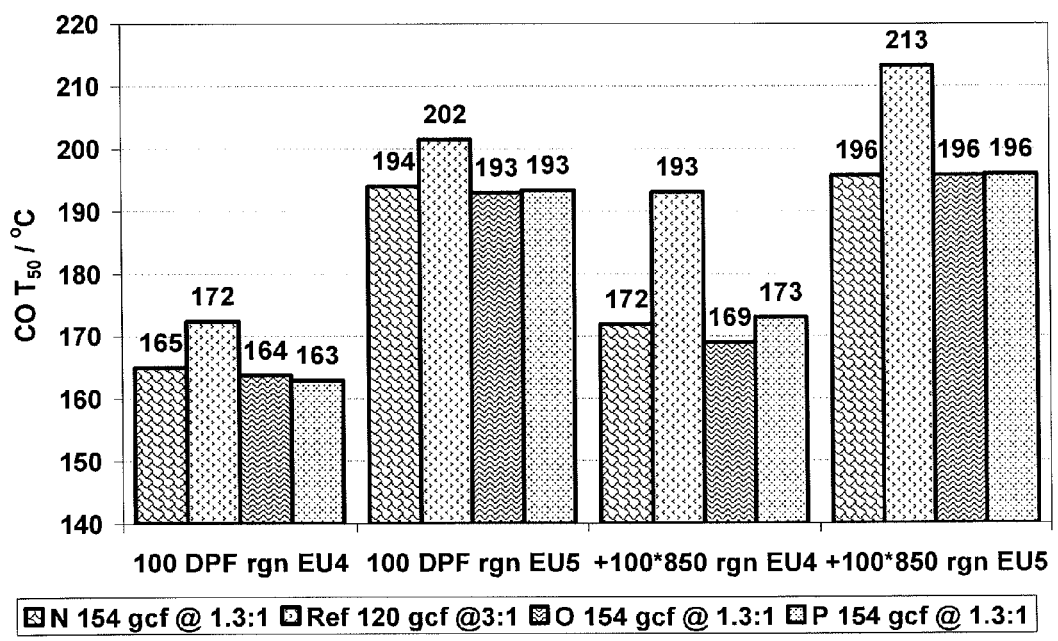

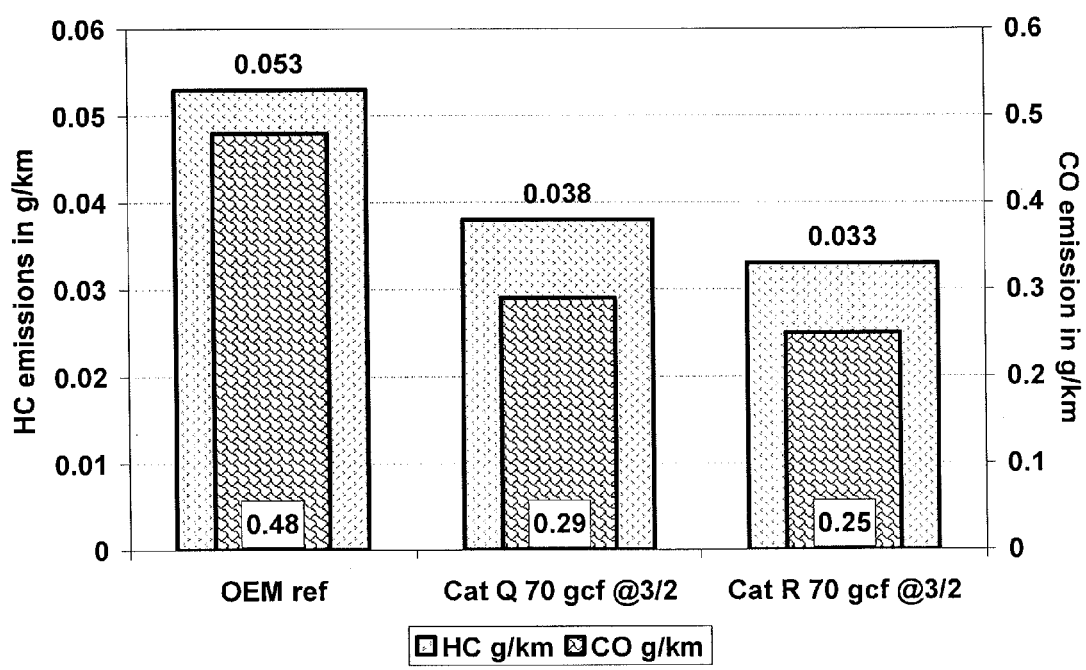
Figure 14: Vehicle performance comparison of OEM versus commercial and zoned high Pd DOC on DV6 engine after 70h of post injection aging.

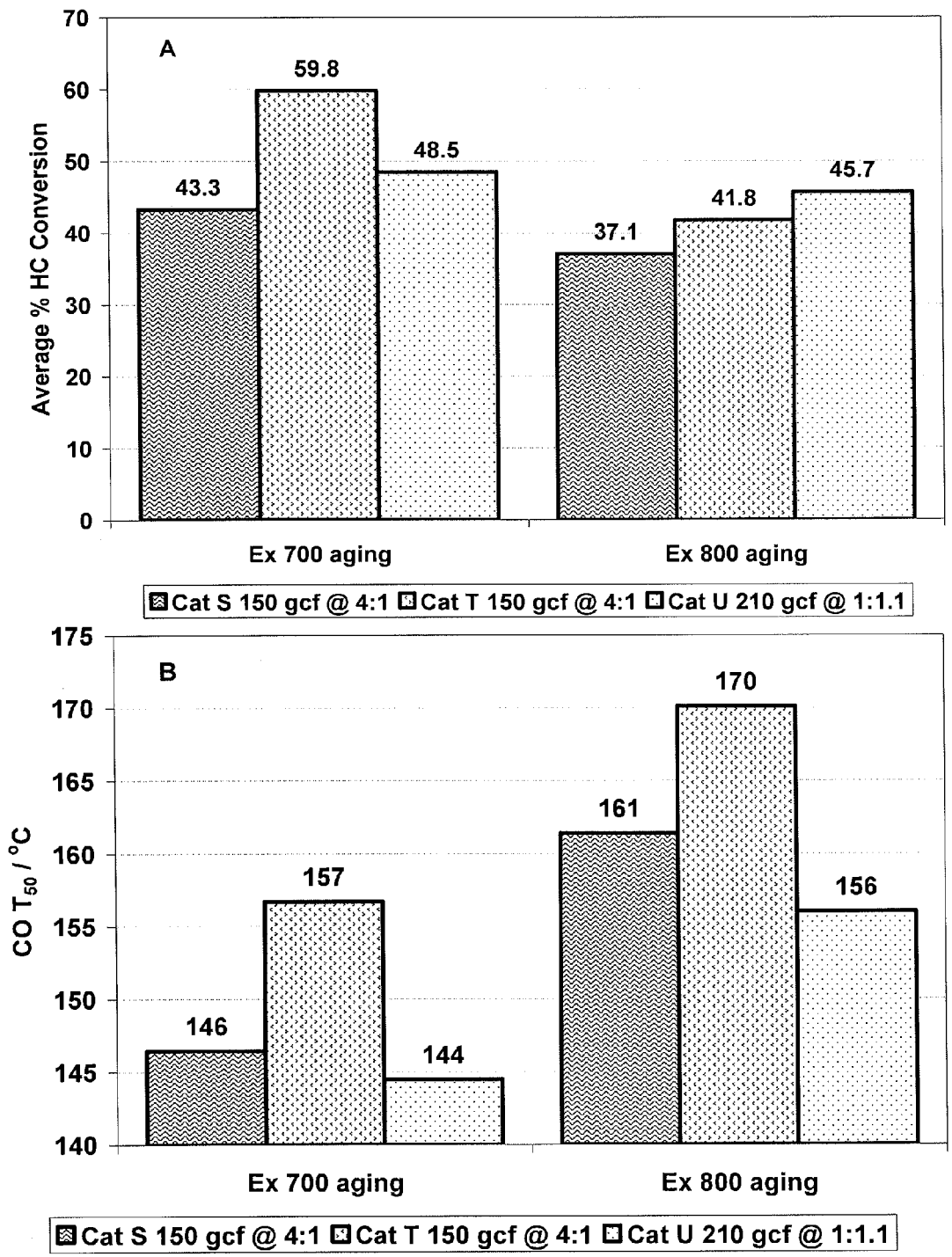
Figure 15: SGB testing / oven aging of reference vs high Pd DOC, with complex HC mix.

Figure 16: SGB testing / oven aging of reference vs high Pd DOC, with $C_3$ only HC mix.
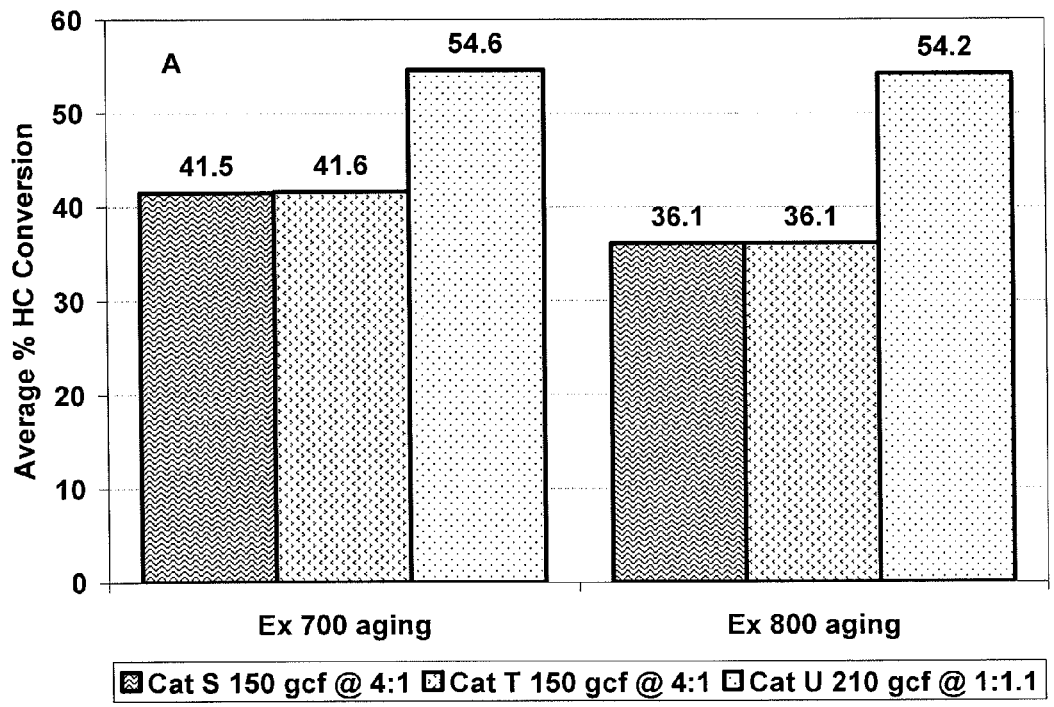
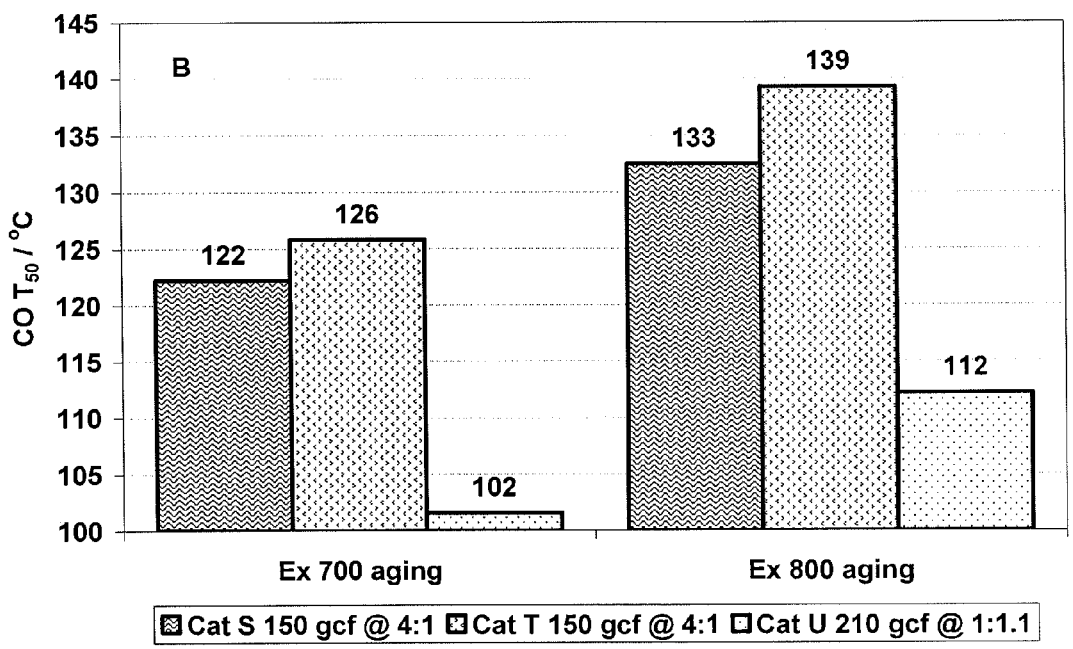

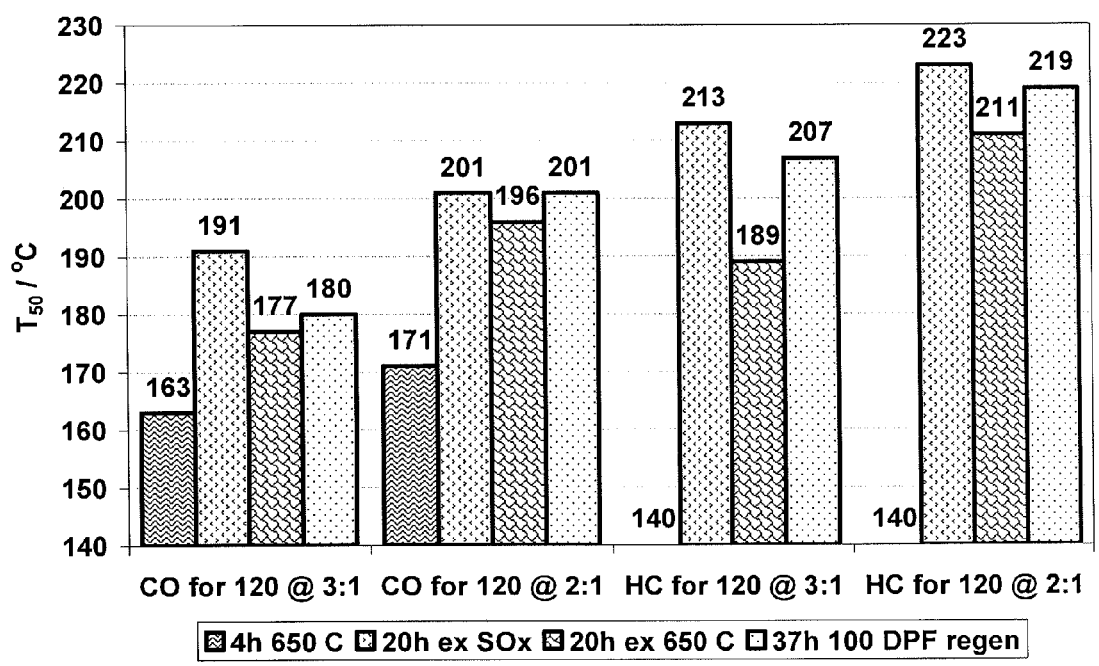
Figure 17: Performance vs Pt:Pd ratio for conventional DOC, 120 gcf at 3:1 versus 2:1.

Figure 18: Performance vs Pt:Pd ratio for high Pd DOC Fresh and Aged (oven 800 °C 25h 10% steam / air).
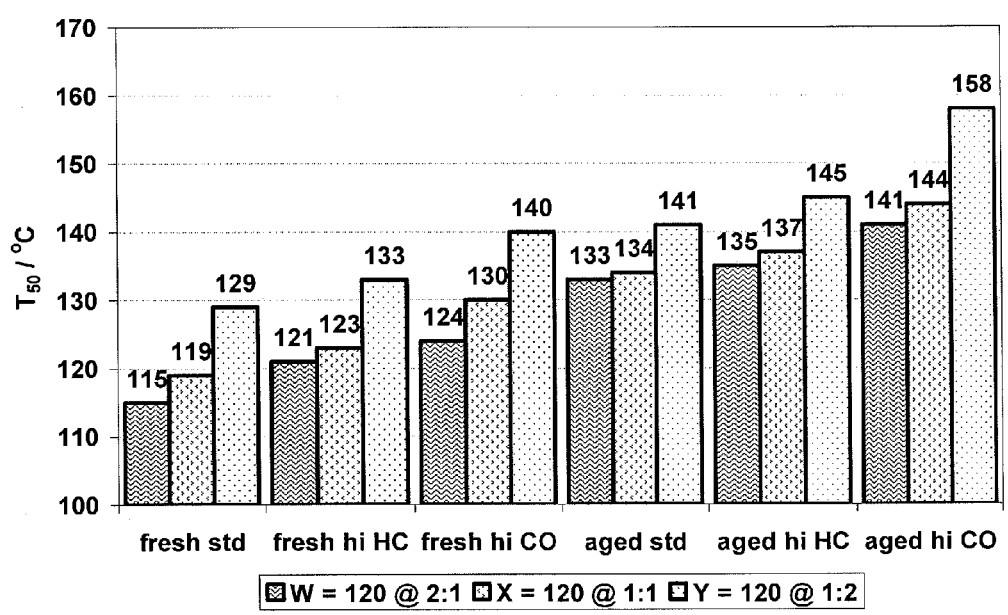

HIGH PD CONTENT DIESEL OXIDATION CATALYSTS WITH IMPROVED HYDROTHERMAL DURABILITY

INTRODUCTION AND BACKGROUND

The exhaust emissions from motor vehicles are a well known and significant source of air pollution. The most significant gaseous vehicular emissions comprise pollutants such as carbon monoxide (CO), oxides of nitrogen (NO and $NO_2$ collectively NOx), and unburnt hydrocarbons (HC). In addition to the gaseous components, the diesel exhaust stream also contains entrained solids, commonly referred to as particulate matter or soot, upon which may additionally be adsorbed volatile/soluble organic fraction (SOF). The gaseous pollutants have been demonstrated to be major contributors to the photochemical smog and ozone events which have been correlated to significant adverse impacts on human health (M. V. Twigg, Applied Catalysis B, vol. 70, (2007), p 2-25). Additionally soot and its associated SOF content present a further health risk as its small size makes this potentially carcinogenic material respirable. Hence increasingly stringent legislative limits have been introduced in order to regulate the emissions from both gasoline and diesel internal combustion engines e.g. Euro 5 or Euro 6, Regulation (EC) No 715/2007 of the European Parliament and of the Council, 20 Jun. 2007, Official Journal of the European Union L 171/1, see also Twigg, Applied Catalysis B, vol. 70 p 2-25 and R. M. Heck, R. J. Farrauto Applied Catalysis A vol. 221, (2001), p 443-457 and references therein.

An advantage of diesel/compression ignition engines is their inherent lean burn operation, i.e. combustion occurs due to fuel compression under conditions of excess $O_2$, which results in increased fuel economy and decreased emissions (in g/km) of CO, HC and $CO_2$ cf. the stoichiometric gasoline engine. Moreover diesel engines offer increased durability and are able to provide high torque at low engine rpm and these attractive characteristics have helped diesel passenger cars gain a >50% market share in the Western Europe market. However despite the inherent advantages offered by lean mode combustion conventional diesel engines still do not meet the aforementioned legislative targets and thus a range of exhaust after-treatment technologies have been developed to address this requirement. These technologies include, but are not limited to, engine control methodologies/modification, alternate combustion cycles and the use of after-treatment systems e.g. catalytic control devices which eliminate exhaust pollutants by promoting chemical changes to convert unwanted compounds into more benign species. In the case of diesel/compression ignition engines the latter devices include the Diesel Oxidation Catalyst (DOC), Diesel NOx Trap/NOx Storage Catalyst (DNT/NSC) and Selective Catalytic Reduction catalyst (SCR) to address emissions of CO, HC (DOC) and NOx and the use of the Catalysed Diesel Particulate Filter (CDPF) for the removal and combustion of entrained solids, commonly referred to as particulate matter or soot.

Of the various catalytic emission reduction systems for diesel emission control listed above, the DOC is both the most widely studied and implemented technology, for examples see U.S. Pat. No. 5,371,056, U.S. Pat. No. 5,462,907, U.S. Pat. No. 6,153,160, U.S. Pat. No. 6,274,107, J. A. A. van den Tillaart, J. Leyrer, S. Eckhoff and E. S. Lox in Applied Catalysis B vol. 10, 1-3, p 53-68 (1996). The design of these systems and materials employed therein are somewhat generic and typically consist of a refractory oxide support e.g. an (modified) alumina, a hydrocarbon storage/release component and an active Precious Group Metal (PGM) to catalyse the oxidative conversion of the pollutants into more benign products ($H_2O$ and $CO_2$).

The use of the HC storage/release component, conventionally a microporous crystalline aluminosilicate also known as a Zeolite or molecular sieve, is employed to prevent low temperature HC poisoning of the PGM centres (see Applied Catalysis B, vol. 70, (2007), p 2, Applied Catalysis A vol. 221, (2001), p 443). The introduction of the Zeolite in the DOC provides a mechanism for the low temperature condensative adsorption of a significant portion of the higher molecular weight unburnt HC species emitted during 'cold start' of the engine. This limits the potential for HC adsorption on active precious metal centres and their resultant poisoning by 'site-blocking'. As the exhaust gas temperature increases the retained HC species are 'released' by evaporation and diffusion out of the porous structure of the Zeolite but only at temperatures where the PGM is fully active and capable of combusting the plume of released species (see U.S. Pat. No. 2,125,231).

The choice of metal(s) in the DOC is based upon their ability to offer the highest turnover frequency (number of reactions per second) with respect to the oxidation of CO and Hydrocarbon to $CO_2$ and $H_2O$ at low temperatures and low concentrations of active component within the DOC formulation. Initially Pt (e.g. U.S. Pat. No. 5,627,124) or more recently the combination of Pt and Pd has been employed as the primary catalytic species (e.g. US2008/0045405 A1, U. Neuhausen, K. V. Klementiev, F.-W. Schütze, G. Miehe, H. Fuess and E. S. Lox in Applied Catalysis B: Environmental, vol. 60, 3-4, (2005), p 191-199 and references therein).

However, the operational requirements of the DOC with respect to conversion of gaseous emissions have been augmented over time to meet specific new challenges arising from successive generations of legalisation, e.g. the ability to efficiently combust post-injected HCs to generate the thermal 'bloom' required to initiate DPF regeneration or more recently the ability to oxidize NO to $NO_2$ in order to facilitate low temperature $NH_3$-SCR chemistry. Moreover, this extensive multi-functionality must be realised without detrimental impact to the primary role of the DOC for effective emission control i.e. the DOC must posses a low temperature 'light off'. Thus in addition to such multi-functionality the DOC must provide operation at low temperatures to minimise 'cold-start' emissions. This requirement is especially critical given the increasingly lower temperature window of operation of the current and next generation diesel engines, which present increasing CO and HC emissions arising from the increased use of exhaust gas recirculation or advanced combustion cycles employed to decrease engine out NOx levels (e.g. WO/2005/031132, Method and Apparatus for Providing for High EGR Gaseous-Fuelled Direct Injection Internal Combustion Engine).

These multiple challenges are rendered yet more difficult due to the intrinsic process of CO oxidation. The catalytic conversion of this pollutant is known to follow a negative order kinetic response i.e. higher concentrations of CO are self-inhibitory to the rate of oxidation (see A. Bourane and D. Bianchi J. Catalysis 222 (2004) 499-510 and references therein). Moreover during reaction there is competition for adsorption centres on the active PGM between CO, NO, HC and $O_2$, with the adsorption of HC being particularly problematic as this acts as a poison to low temperature operation, necessitating the inclusion of the aforementioned zeolite component to address this issue. Hence as engine out concentrations of CO and HC increase and engine out temperatures decrease the challenge for effective operation of the catalyst to fulfil legislative requirements becomes increasingly difficult. A further and final requirement is that the DOC must maintain high levels of activity through end-of-life. This is a stringent requirement given the DOC is exposed to transients of extreme temperatures in the presence of steam e.g. for the operation of a close-coupled catalyst (to minimize light-off time) or during the active regeneration strategy required for the DPF. The latter case is especially challenging since there is an in-catalyst exotherm and steam generated by the combustion of post-injected hydrocarbons specifically located at the dispersed PGM sites. Such processes are known to result in catastrophic sintering (PGM particle coalescence), particularly for Pt (see M. Chen, L. D. Schmidt, J. Catal. 56 (1979) 198). This has resulted in the aforementioned introduction of Pt/Pd bi-metallic DOCs with a primary role of Pd to inhibit the rate of Pt sintering (Lox et al. Applied Catalysis B: Environmental, vol. 60, 3-4, (2005), p 191).

However, despite these many developments, it has still been necessary to increase the PGM content of conventional DOCs in order to fulfil the emission targets for end-of-life performance. This in turn has increased demand for Platinum (Pt) and Palladium (Pd) resulting in price pressure for these PGMs and a resultant impact on the cost of emissions aftertreatment systems for the vehicle manufacturers and end customer. The relative costs of Pt versus Pd (average price Jan. 1, 2008 through Jan. 1, 2009 was 1535 US dollars and 342 US dollars respectively) means there is a continuing incentive to enable the use of higher Pd, lower Pt content DOC technologies as a means of decreasing total system cost. However, to date, practical limitations have been encountered regarding the usage of lower Pt:Pd ratios. While Pd is effective at enhancing the stability of PGM dispersion it has been found that there appears to be a practical limit beyond which CO and HC oxidation performance are below the levels required to fulfil emissions targets (US2008/0045405 A1). Additionally it is known that Pd enhances the sulfur sensitivity i.e. poisoning of the DOC, resulting in retardation of catalyst light-off (see, The Impact of Sulfur in Diesel Fuel on Catalyst Emission Control Technology—MECA white paper Mar. 15, 1999 and references therein at www.meca.org). Finally Pd has also been found to inhibit the oxidation of both paraffins and NO, the former issue resulting in increased tailpipe HC, while the inhibition of $NO_2$ generation is linked to decreased performance for both CDPF and urea-SCR systems (US2008/0045405 A1).

Hence what is required in the art is a method or technology to enable the use of high Pd content, more cost effective, diesel oxidation catalysts to replace conventional high Pt content technologies. These high Pd DOCs must offer competitive fresh, de-greened, hydrothermally durable and poison resistant activity under the diverse conditions of the diesel exhaust environment while enabling superior performance at equal metal cost or equal performance at decreased cost. Additionally they must provide the aforementioned improvements whilst retaining high NO and HC oxidation functionality as required in modern multi-brick emission control architectures.

SUMMARY OF THE INVENTION

The invention disclosed herein describes a new class of layered and zoned DOC systems capable of addressing the challenges and requirements outlined previously. Thus we demonstrate, in a surprising and novel discovery, the successful application of Pd-rich DOCs for the conversion of CO and HC under fuel—lean conditions. This new class of Pd-rich DOCs provides both high activity but also enhanced hydrothermal durability, especially with regards to the cycle post-injection DPF regeneration cycles typical of modern vehicular applications, as compared to conventional DOC technologies. These benefits are realised by the combination of functionalised layers to introduce the capability of the DOC to resist 'quenching' i.e. transient active site blocking arising from (especially) HC or CO under lower temperatures i.e. 'cold start' conditions. Thus the use of 'quench' tolerant overcoat with a second dedicated oxidation layer, which itself may also be Pd rich, provides a synergy which enables high conversion of pollutants at lower temperatures and with increased hydrothermal durability.

In another embodiment, the present invention describes a method for removal of gaseous pollutants from the exhaust stream of a diesel/compression ignition engine. This is achieved by contacting the exhaust stream with the novel catalyst described herein, where the catalyst comprises a novel washcoat design comprising two functionalised layers which enable high catalytic performance over a range of PGM contents and ratios of Pt:Pd, including technologies enriched in Pd content.

More particularly, the present invention provides an oxidation catalyst, for the remediation of pollutants from the exhaust of a compression ignition comprising a carrier or substrate upon which is disposed at least two layers of washcoat wherein:

a. the first layer or undercoat layer comprises a refractory oxide support, optionally a zeolite, optionally an oxygen storage material and a primary catalyic metal selected from the group consisting of platinum, palladium, iridium, rhodium, ruthenium, alloys thereof, and mixtures thereof b. a second layer or overcoat layer comprises a refractory oxide support, optionally a zeolite, optionally an oxygen storage material and a primary catalytic metal selected from the group consisting of platinum, palladium, iridium, rhodium, ruthenium, alloys, thereof, and mixtures thereof, c. a catalyst substantially enriched in Pd content and particularly wherein the Pd to Pt ratio of the overcoat layer is greater than the Pd to Pt ratio of the undercoat. Preferably the Pt:Pd ratio of the undercoat is from about 20:1 to about 1:2, the Pt:Pd ratio of the overcoat is from about 2:3 to about 0:1 e.g. a Pt-free, Pd-only layer.

In a preferred embodiment, the Pt:Pd ratio of the undercoat is about 1:1 and the Pt:Pd ratio of the overcoat is about 1:2. The overcoat may optionally contain salts or oxides of barium or lantherium.

In a preferred embodiment, the refractory oxide support in the undercoat and/or the overcoat is alumina, a modified or heteroatom doped alumina, zirconia or titania or combinations thereof. The heteroatom dopant can be Si, Fe, Zr, Ba or La or combinations thereof.

The optional zeolite in the undercoat and/or overcoat is selected from the group Beta (β), Chabazite, Clinoptilolite, Faujastie, Ferrierite, Mordenite, Offretite, Silicalite, zeolite X, zeolite Y, ultrastable zeolite Y, ZSM5, ZSM11, ZSM22 or other ZSM series material or structural isomorphs thereof, e.g. SAPO34 or mixtures thereof.

The catalyst device of the invention has an inlet and an outlet and, and the overcoat is optionally applied to cover a length of about 5% to about 75% from the inlet, and the undercoat is applied to cover a length of about 95% to about 25% from the inlet.

Another aspect of the invention relates to a diesel oxidation catalyst wherein the catalyst has an inlet and an outlet, wherein a washcoat zone is applied to cover a length of about 25% to about 95% from the inlet and the washcoat contains Pt:Pd at a ratio of about 2:3 to about 0:1 and a second washcoat zone is optionally applied to cover a length of about 5% to about 75% from the outlet and the washcoat contains Pt:Pd at a ratio of about 2:1 to about 1:2.

A still further aspect of the invention relates to a method of treating exhaust gas comprising passing an exhaust gas over a catalytic device, comprising: a housing disposed around a substrate; an oxidation catalyst, for the remediation of pollutants from the exhaust of a compression ignition comprising a carrier or substrate upon which is disposed at least two layers of washcoat wherein:

a. the first layer or undercoat layer comprises a refractory oxide support, optionally a zeolite, optionally an oxygen storage material and primary catalytic metal(s) selected form the group of Precious Group Metals consisting of platinum, pallandium, iridium, rhodium, ruthenium, alloys thereof, and combinations thereof;

b. a second layer or overcoat layer comprises a refractory oxide support, optionally a zeolite, optionally an oxygen storage material and primary catalytic metal(s) selected from the group of Precious Group Metals consisting of platinum, palladium, iridium, rhodium, ruthenium, alloys thereof, and combinations thereof;

c. a catalyst substantially enriched in Pd content and particularly wherein the Pd to Pt ratio of the overcoat is greater than that of the undercoat.

The catalytic device of the invention further includes a retention material disposed between the housing and the substrate.

Benefits and features include:

a) Provision for a DOC to promote lower temperature oxidation of CO and HC.

b) Provision for a DOC with improved hydrothermal durability, especially with regards to light-off after aggressive post-injection/CDPF regeneration cycles.

c) Provision for a DOC able to employ high Pd contents without negative impact on activity, as is noted for conventional DOC designs. This offers the possibility of either cost savings or performance benefits as is appropriate for the specific application.

d) The ability to employ layered and zoned technologies to optimise primary CO and HC oxidation performance without loss in secondary performance characteristic e.g. the use of a Pd-rich/Pd-only overcoat layer or zone with a more Pt-rich undercoat pass to provide increased CO and HC oxidation function whilst maintaining high NO oxidation to $NO_2$ to enable high $NH_3$—SCR activity for NOx reduction or $NO_2$ catalysed soot oxidation for a downstream CDPF.

e) Provision for a DOC with a second layer or zone rich in Pd such that the high Pd content provides increased HC oxidation function for post-injected HCs for CDPF regeneration with decreased thermal deactivation or sintering of the PGM dispersion.

This strategy contrasts with that employed in the conventional single layer DOC systems wherein there is a more mono-modal description of the active site and this sole type of active site is expected to provide a multiplicity of functions. Moreover in the conventional DOC design it is not predicted that 'quenching' will occur and hence no specific designs are employed therein to address this fundamental limitation and inhibition in performance.

BRIEF DESCRIPTION OF THE DRAWINGS

FIG. 1 shows the effect of a Propene/Propane mix (120 ppm C1) on the CO light-off ($T_{50}$) for conventional PtPd DOC, 120 gcf PGM @ 3:1, in SGB testing.

FIG. 2 compares the light-off and quench/light-down performance for conventional PtPd DOC 120 gcf @ 3:1 in SGB testing.

FIG. 3 shows the impact of CO or HC pulses on the isothermal activity at 170, 160 and 150° C. for conventional PtPd DOC 120 gcf @ 3:1.

FIG. 4 shows the light-off and light-down for next generation Catalyst A.

FIG. 5 compares the light-off and light-down for the conventional PtPd DOC 120 gcf @ 3:1, and three next generation 'quench' resistant DOC technologies A, B, and C.

FIG. 6 illustrates the impact of CO or HC pulses on the isothermal activity at 170, 160 and 150° C. for next generation 'quench' resistant DOC Catalyst B.

FIG. 7 shows the impact of CO or HC pulses on the isothermal activity at 170, 160 and 150° C. for next generation 'quench' resistant DOC Catalyst C.

FIG. 8 summarizes engine dynamometer aging and testing of conventional DOC, 120 gcf PGM at 3:1 versus 'quench' resistant DOC technologies at 160 gcf Pt:Pd 1:1.13.

FIG. 9 illustrates engine dynamometer aging and testing of conventional DOC, 120 gcf PGM at 3:1 versus 'quench' resistant DOC technologies at 160 gcf Pt:Pd 1:1.13.

FIG. 10 compares the engine dynamometer aging and testing of conventional DOC, 120 gcf PGM at 3:1 vs 'quench' resistant DOC technologies at differing PGM content and Pt:Pd ratios (G is 160 @ 1:1.13, H is 143 @ 1.3:1 and J is 183 @ 1:1.77).

FIG. 11 shows the vehicle performance of the DOC technologies ex FIG. 10.

FIG. 12 compares the dyno aging/testing of a conventional DOC-120 @ 3:1 vs 'quench' resistant DOCs (160 @ 1:1.13) with differing Pt:Pd distributions in Pass 1 and 2.

FIG. 13 contrasts the dyno testing of a conventional DOC, 120 gcf PGM at 3:1 vs 50% zoned coated 'quench' resistant DOCs at 154 gcf @ 4:3 (1.3:1).

FIG. 14 summarizes the vehicle performance of an OEM DOC versus one commercial DOC 70 gcf @ 3/2 versus a zone-coated quench resistant DOC 70 gcf @ 3/2.

FIGS. 15A and B show the SGB testing/oven aging data for a conventional DOC, 150 gcf PGM @ 4:1 vs 'quench' resistant DOC, 210 gcf PGM @ 1:1.1 using complex HC mix.

FIGS. 16A and B show the SGB testing/oven aging data for a conventional DOC, 150 @ 4:1 vs 'quench' resistant DOC, 210 gcf PGM @ 1:1.1 using C3 only HC mix.

FIG. 17 illustrates the impact of Pt:Pd ratio on performance of conventional DOC, 120 gcf PGM at 3:1 versus 120 gcf @ 2:1 Pt:Pd.

FIG. 18 shows the impact of Pt:Pd ratio for 120 gcf (2:1, 1:1 and 1:2) on the performance of a quench resistant DOC fresh and aged (oven 800° C., 25 h, 10% steam air).

DETAILED DESCRIPTION OF THE INVENTION

The present invention relates to the development and use of novel high Pd content diesel oxidation catalyst (DOC) for emission aftertreatment catalysis. This is made possible by the development of a specific layered or zoned strategy, wherein the distinct layers afford specific functionalities to the catalyst and work in concert to provide an effective synergy for overall improvements in performance and durability. Thus the design herein employs a more conventional undercoat (pass 1) to facilitate the required CO, HC and NO oxidation reactions and a second layer or zone (pass 2), which is enriched in Pd or indeed Pd-only, which has been developed to provide the catalyst with a characteristic dubbed 'quench' tolerance. This enables the lower temperature light-off of the undercoat (pass 1) as well as enhancing the hydrothermal durability of the DOC, especially to post injection (DPF regeneration) aging cycles due to the ability of the Pd-rich/Pd-only overcoat to facilitate high rates of oxidation of post-injected HC, thereby decreasing the exothermal stress in the more conventional undercoat formulation. Both layers comprise typical base metal components e.g. alumina (or other suitable refractory oxide e.g. $ZrO_2$, $TiO_2$), zeolite for bulk HC storage/release and optionally an oxygen storage material based upon CeZrOx. Typical aluminas that may be employed in this invention include $\gamma$-$Al_2O_3$, $\delta$-$Al_2O_3$, $\theta$-$Al_2O_3$, or other transition alumina. Additionally the alumina could be modified e.g. by the inclusion of heteroatom species with cationic doping by Si, Fe, Zr, Ba or La preferred. However, notwithstanding these modifications the novel invention herein is not related to specific material development but rather to the demonstration of a previously less well understood transient deactivation mechanism and a means to overcome this limitation and thus gain significant improvements in the activity and hydrothermal durability of DOCs and especially Pd-rich DOCs.

The concept of quench tolerance is proposed, without wishing to be bound by theory, to be based upon the transient active site blocking of PGM sites by 'toxic' HC species in the exhaust. While the idea of HC poisoning is well known it has been previously believed that the presence of zeolite in the DOC washcoat was sufficient to address this issue (Applied Catalysis B, vol. 70, (2007), p 2, Applied Catalysis A vol. 221, (2001), p 443, U.S. Pat. No. 2,125,231). The data herein however contradict this assertion (see hereafter). Indeed it is noted that 'quenching'/active site blocking by specific HCs may still occur at low temperatures even for zeolite-containing DOCs since the zeolite is only capable of interacting with a limited range of hydrocarbons. There are two fundamental limits which determine this range. Firstly, is the limit imposed by so-called 'shape selectivity'. All zeolites have well defined channel and/or cage structures arising from the combination of primary building units (repeating structures derived from the assemblages of $TO_4$ tetrahedra, where T is Si or Al) e.g. for MFI zeolites the primary building unit is the 5-1 ring structure (see http://www.iza-structure.org/databases for further details). As stated the combination of these primary building units gives rise to the secondary order within the zeolite and thus enforces limits upon the maximum size of species which may enter the structure, i.e. provides the 'molecular sieve' function. For zeolite $\beta$, the structure contains two 12 ring structures, one a regular ring of 5.6 by 5.6 Å and a second more irregular ring of ca. 7.7 by 6.6 Å (at maximum and minimum), and hence molecules with diameters (so-called critical diameters) larger than this are excluded and thus the zeolite cannot prevent adsorption of such large HCs e.g. poly-substituted aromatics or poly-aromatic species on active PGM sites. Secondly, the ability of a conventional proton zeolite to trap light hydrocarbons i.e. permanent gas HCs e.g. $CH_4$, $C_2$, $C_3$, $C_4$ species etc., is negligible as such species will not undergo the conventional condensative adsorption within the pore structure. Hence a second class of potentially toxic HC species, specifically unsaturated $SP^2$ and SP hybridised HCs, can diffuse rapidly through the zeolite and washcoat in general until they come into contact with the active PGM sites whereupon they are strongly chemisorbed, again resulting in transient site blocking/quenching. Moreover, it should be noted that the primary use of zeolites in the petrochemical industry is as cracking catalysts i.e. to promote the conversion of long-chain HCs into short chain, typically unsaturated, species (e.g. U.S. Pat. No. 4,740,292). Thus the use of zeolites themselves can also generate in-situ, the kinds of toxic short chain alkenes/alkynes which can subsequently poison the PGM function of the DOC.

In order to circumvent the low temperature transient deactivation of the DOC by toxic HCs a new design strategy has been developed and implemented. Herein a layered or zoned formulation is introduced. A minimum of two layers or zones are applied consecutively to the monolithic substrate or carrier, each layer providing specific functionality and in combination a direct synergy. The first layer/pass/zone applied to the substrate, hereafter the undercoat, comprises a refractory oxide support e.g. (modified/doped) alumina, zirconia etc. and optionally a zeolite and also optionally an OS material. In addition the undercoat is characterised by possessing Pt and optionally Pd at a ratio of about Pt:Pd 20:1 to about 1:2. It should be noted that the high degree of flexibility in Pt:Pd ratio is enabled by use of the second layer/zone, hereafter overcoat. This overcoat again comprises a refractory oxide support e.g. (modified/doped) alumina, zirconia, titania etc. and optionally a zeolite and also optionally an OS material. Indeed to simplify the manufacturing scheme of this new class of DOCs, the base metal oxide components of the undercoat and overcoat may be identical. This enables production of a 'white' washcoat which is split into two batches prior to coating and the appropriate PGM loads and ratios added individually. As indicated by the preceding statement, the overcoat also contains precious metal, but in this instance the washcoat is enriched in Pd such that the ratio of Pt:Pd is about 0:1 (i.e. Pd-only) to about 2:3. This strategy is contra to the teachings in US2008/0045405 A1 wherein a layered design is also employed but this design is based upon a Pt-enriched overcoat and Pd-enriched undercoat. Additionally US2008/0045405 A1 stresses the importance of avoiding Pd migration to the overcoat and that it is necessary to omit zeolite (HC storage component) from the undercoat, neither of these teachings are consistent with the current invention. Moreover this design is intended to maximise $NO_2$ production rather than provide optimised CO, HC and NO oxidation function. Further differentiation will be drawn in the following examples.

Thus the following examples contained herein shall describe and differentiate a next generation novel DOC design. The novel oxidation catalyst described herein is intended for the remediation of pollutants from the exhaust of a compression ignition engine. It comprises a carrier or substrate upon which is disposed at least two layers of washcoat wherein at least both layers comprise a refractory oxide support (alumina, heteroatom doped alumina e.g. Si, Fe, Zr, Ba or La, or zirconia as $ZrO_2$, titania etc.), optionally a zeolite e.g. Beta ($\beta$), Chabazite, Clinoptilolite, Faujasite, Ferrierite, Mordenite, Offretite, Silicalite, zeolite X, zeolite Y, Ultrastable zeolite Y, ZSM5, ZSM11, ZSM22 or other ZSM series material or structural isomorphs thereof e.g. SAPO34 or mixtures thereof, optionally an oxygen storage material and primary catalytic metal(s) selected from the group of Precious Group Metals consisting of platinum, palladium, iridium, rhodium, ruthenium, alloys thereof, and combinations thereof. The layers of the catalyst may contain different base metal components or indeed identical components but the two layers are especially differentiated in that the second layer (overcoat) is substantially enriched in Pd content and particularly wherein the Pd to Pt ratio of the overcoat is greater than that of the undercoat. For example the Pt:Pd ratio of the undercoat is from about 20:1 to about 1:2 while the Pt:Pd ratio of the overcoat is from about 2:3 to about 0:1 i.e. a Pt-free, Pd-only layer. In a further illustrative example the catalyst may contain two layers wherein the Pt:Pd ratio of the undercoat is about 1:1 and the Pt:Pd ratio of the overcoat is about 1:2. Optionally the overcoat may additionally contain Rhodium. The overcoat may additionally be modified by the inclusion of salts or oxides of Barium and Lanthanum. Moreover, the layers of the catalyst may also be expressed as zones e.g. wherein the catalyst has an inlet and an outlet, and the overcoat is applied to cover a length of about 5% to about 75% from the inlet. Similarly, wherein the catalyst has an inlet and an outlet, and the undercoat is applied to cover a length of about 95% to about 25% from the inlet.

FIG. 1 illustrates the Synthetic Gas Bench (SGB) performance data for a commercial Pt—Pd DOC (120 gram per cubic foot, hereafter gcf @ 3Pt:1Pd) after aging/stabilisation at 650° C. in steam/air for 20 h. The data contrasts the CO light-off temperatures ($T_{50}$) at 400, 800 or 1200 ppm CO in the presence or absence of 150 ppm C1 propene/propane (3:1) (12% $O_2$, 150 ppm NO, 5% $CO_2$, 5% $H_2O$, balance $N_2$ at a total flow of 30 l/min, ramp 75-325° C. at 15° C./min). The impact of the HC on performance is clear and unambiguous. In the absence of HC, performance is negatively correlated, i.e. the light-off temperature exhibits an inverse correlation with respect to CO concentration, in agreement with extensive studies regarding CO oxidation which repeatedly show CO oxidation is negative reaction order with respect to CO concentration e.g. A. Bourane and D. Bianchi J. Catalysis 222 (2004) 499-510. However, in the presence of small amounts of gaseous propene/propane, the response of the catalyst is completely divergent. In this instance the $T_{50}$s are increased by 15-50° C. but more significantly they are all equal within the experimental error of the test i.e. the performance of the catalyst is independent of CO concentration but is rather dictated by an external phenomenon linked to the presence of the HC. It is proposed that this phenomenon is a transient inhibition effect involving the preferential adsorption of propene on the active centres of the Pt—Pd required for $O_2$ dissociative adsorption (the proposed rate limiting step in CO oxidation). This is consistent with the high sticking probability of propene on the high defect planes of PGM surfaces resulting in a site-blocking phenomenon which is only overcome at temperatures sufficient to facilitate oxidative desorption of the HC (R. Burch and P. J. Millington, Catalysis Today, Vol 26(2), 1995, p 185). Since this temperature is independent of CO concentration then catalyst light-off exhibits the independent activity trace in FIG. 1.

The phenomenon of transient site blocking is further examined in FIG. 2 which shows the full light-off (positive temperature ramp) and quench (negative temperature ramp/cooling cycle) for the commercial DOC of FIG. 1. Herein several salient features are evident. Firstly during light-off, one notes conversion of HC prior to CO. Secondly, the light-off of CO is entirely coincident with HC. Finally, during the quench cycle low levels of HC conversion continue after CO oxidation decreases to 0%. These responses are entirely consistent with the mechanism proposed. Hence at low temperatures adsorption of propene results in the apparent conversion noted. The interaction of HC is of some importance since although the DOC contains zeolite/HC scavenger (β, SAR 40), it is apparent that the zeolite does not prevent HC poisoning by propene, for reasons explained previously. Thus the propene passes through the washcoat unaffected until it comes in contact with the PGM centres whereupon it is chemisorbed, resulting in site-blocking. Then as the temperature increases the conversion and desorption of the chemisorbed HC begins and as each active site is 'cleaned' of the transient HC poison, the rate of $O_2$ dissociative adsorption increases thereby further catalysing the oxidation of adsorbed HC and CO species, until light-off is achieved and the PGM surface is completely converted from a reduced (HC/CO covered) to a fully oxidised (O covered) condition. However as the temperature is subsequently cooled and the rate of oxidation decreases i.e. under the quench cycle, then the exotherm of oxidation associated with the active PGM centres also decreases, thereby further decreasing the rates of all oxidative processes. This establishes a negative feedback loop until a critical temperature, dubbed $Q_{50}$ (quench 50% conversion), is reached. Then the surface coverage again becomes dominated by CO and HC species and surface O content is low. Moreover at this point competition for surface sites between $O_2$, CO and propene is re-established, with the latter becoming increasingly favoured, hence apparent HC conversion continues when CO conversion is zero.

FIG. 3 further examines the ability of CO and propene to 'quench' the catalytic oxidation function of the commercial DOC. This Figure contrasts the performance of the 120 gcf 3:1 DOC under isothermal conditions with transient pulses of either CO or HC viz. In the CO pulse test, the DOC is exposed to 12% $O_2$, $C_3H_6$/$C_3H_8$ (3:1) @ 150 ppm C1, 150 ppm NO, 5% $CO_2$, 5% $H_2O$ and $N_2$ (30 l/min) plus 400 ppm CO, which is increased to 1200 ppm for 5 min to attempt to quench catalytic function. The pulse is repeated 3 times (5 min low CO, 5 min high CO) at 170° C., and then again at 160° C. and finally again at 150° C. Conversely in the HC pulse test a comparable gas mix, with CO at 400 ppm, is employed but herein HC is introduced at 150 ppm C1, or 450 ppm C1, again in 3 cycles and again at 170, 160 and 150° C. The responses for the tests in FIG. 3 again show significant differences. In the case of CO pulsing, the catalyst maintains 100% CO conversion at 170° C. under both low and high CO conditions but upon decreasing the temperature to 160° C. the catalyst is thermally deactivated and <20% conversion is seen for both low and high CO at 160 and 150° C., consistent with catalyst deactivation due to domination of the surface by HC and CO species. The bed temperature of the catalyst reflects the various processes. Thus small increases in the bed exotherm are associated with the high CO pulses and as the catalyst deactivates the exotherm in the catalyst is seen to traverse from the front of the core to the rear (where the thermocouple was located) and hence immediately prior to complete deactivation an exotherm is recorded. In the case of the HC pulses a different response is noted. Thus at 170° C., each HC pulse is associated with a much larger bed exotherm than seen for the CO pulses, consistent both with the higher increase in fuel content but also with the exotherm being close to the outlet of the core. Moreover, during the second HC pulse a decrease in CO conversion is noted. This loss in CO function is further evident during the third pulse consistent with the proposed mechanism of HC site blocking resulting in catalyst deactivation, a process we have dubbed 'quenching'. Then as the temperature of the catalyst is decreased to 160° C., immediate and complete deactivation occurs, suggesting the catalyst was already in a more unstable condition with regards to oxidation function, this sensitivity being ascribed to a significantly higher residual HC coverage arising from the HC pulsing.

In order to investigate the phenomenon of quenching in detail a series of SGB tests were performed using a model 3% Pd—$ZrO_2$ catalyst. The results of these tests are summarised in Table 1. The test conditions employed 1000 ppm CO, 100 ppm NO, 3.5% $CO_2$, 13% $O_2$, 3.5% $H_2O$, balance $N_2$ and total flow 5 l/min with ramp from 50 to 300° C. at 10° C./min. In addition HC was included or omitted as detailed in Table 1. In the various tests standard meshed powders of the reference DOC and various pre-beds of zeolite or metal containing powder were employed, and the impact on CO light-off examined. The data present an internally consistent pattern.

Hence when the effective exposure of the Pd—$ZrO_2$ to HC is 0 ppm, light-off is ca. 100° C. This is seen to occur in the absence of HC and for n-Octane with β40 pre-bed. In contrast in the absence of zeolite with propene as the HC, light-off is retarded to 114° C., reflecting some poisoning of the active site. However upon inclusion of the zeolite a dramatic deactivation is seen, the $T_{50}$ is now 210° C. This is consistent with propene-derived poisons from the zeolite resulting in catastrophic site blocking. A similar deactivation is seen for the mixed HC with zeolite case, with the extent of deactivation correlating to the concentration of propene in the feed gas. Thus contra to previous experience the inclusion of the zeolite is not beneficial for the performance of the DOC in this instance. In contrast, if we replace the conventional zeolite pre-bed with a metal containing (Pt, Pd or Ag) then we almost completely recover the very high performance of the model DOC. This is attributed to the ability of the dispersed metal sites in the pre-bed catalyst to chemisorb the toxic HC species from the gas stream and thus avoid the transient site blocking of the active sites on the Pd and thus allow the normal activity of the Pd—$ZrO_2$ to be manifest. This attribute we have dubbed 'quench' resistance and is a key design feature of the next generation DOC.

Table 1 summarizes the impact of HC content and species, and the role of zeolite or 'quench' resistant pre-bed on the activity of a 3% Pd—$ZrO_2$ model DOC.

TABLE 1

The impact of HC content, HC speciation, and the presence or absence of zeolite on the activity of a 3% Pd—$ZrO_2$ model DOC in SGB powder studies. 1:1 Mix denotes 1:1 mixture of Propene and n-Octane (350 ppm C1 of each HC).

| Prebed | Prebed/g | Pd—$ZrO_2$/g | PPM HC | HC type | CO $T_{50}$/° C. |
|---|---|---|---|---|---|
| None | — | 2 | 0 | — | 97 |
| None | — | 2 | 750 | Propene | 114 |
| β40 | 0.5 | 1.5 | 750 | n-Octane | 99 |
| β40 | 0.5 | 1.5 | 750 | Propene | 210 |
| β40 | 0.5 | 1.5 | 750 | 1:1 Mix | 179 |
| 1.73% Pt—$Al_2O_3$-β40 | 0.25 | 1.75 | 750 | 1:1 Mix | 103 |
| 1.73% Pd—$Al_2O_3$-β40 | 0.25 | 1.75 | 750 | 1:1 Mix | 104 |
| 1.73% Pd—$Al_2O_3$ | 0.25 | 1.75 | 750 | 1:1 Mix | 103 |
| 5% Ag—$Al_2O_3$ | 0.25 | 1.75 | 750 | 1:1 Mix | 104 |

The performance of the commercial DOC of FIG. 2 is now contrasted with that for Catalyst A (aged as per reference), a next generation DOC (FIG. 4). The DOC herein contains Rh, which is included in the overcoat, and is employed specifically for its ability to oxidise CO with far less inhibition or competition from HC i.e. Rh is oxo-phillic and hence the surface is found to contain significantly higher O coverage under all conditions. Due to this characteristic the CO light-off and quench occur at far lower temperatures than for the commercial DOC. Moreover, the CO and HC light-off features are no longer interconnected further reflecting the change in surface competition vis-à-vis O, HC and CO for this technology. However it should also be noted that the concept technology described herein achieves high performance at a significant price premium due to the use of Rh. Hence what is required is to achieve comparable activity benefits at competitive price.

This is achieved in FIG. 5, wherein performance ($T_{50}$ and $Q_{50}$) of catalysts A, B, and C next generation 'quench' resistant layered technologies are contrasted to the commercial DOC at two concentrations of HC, 150 ppm C1 and 450 ppm C1 propene/propane (3:1), respectively. Note the DOCs B and C represent ca. 3% metal saving, based upon the average PGM price Jan. 1, 2008-Jan. 1, 2009. The data confirm the benefit of the quench resistant technologies for light-off (50, 3 and 9° C. respectively), particularly under conditions of high HC concentrations (52, 6 and 18° C. respectively). There are similar benefits for $Q_{50}$, re-confirming the increased robustness of the new design to HC poisoning this time during cycle down. This benefit is predicted to be of especial significance during typically EUDC cycles which encompasses multiple light-off and light-down events during the lower speed acceleration and deceleration cycles. It is proposed that the benefits observed are due to the presence of the Pd in the overcoat which serves as a 'getter' or regenerable sorbent to the transient HC toxins in the feed, in a manner similar to the metal-containing pre-beds of Table 1. Thus at low temperatures the bulk of HCs passing through the Pd layer are retained/chemisorbed on the Pd resulting in a lower concentration of transient poisons diffusing through to the PtPd undercoat and thereby enabling high $O_2$ dissociative adsorption and reaction with concomitant light-off and quench benefits. Then once the undercoat attains light-off the resultant exotherm enables the oxidative desorption and reaction of any HC species retained upon the Pd sites in the overcoat.

The increased quench resistance of the new designs are further confirmed in CO and HC isothermal pulse testing, following the protocols defined in FIG. 3. Hence FIGS. 6 and 7 show the enhanced performance of the high Pd DOCs. Indeed, unlike the commercial DOC both technologies exhibit stable performance at 170° C. under CO and especially HC pulsing. Also neither exhibit quenching under steady state conditions as the temperature is decreased to 160° C., which it is noted, is below the $T_{50}$ for catalyst B in standard light-off testing. This further reflects the impact surface coverage of HC and CO versus O has upon activity. Further pulsing at 160° C. differentiates the DOCs further as well as the comparative impact of CO versus HC pulses. Catalyst B maintains full CO conversion at 160° C. at both high and low CO concentration but in contrast exhibits stepwise deactivation with subsequent pulses of high HC, akin to titration of the active sites by retention of 'toxic', site-blocking propene-derived species. Moreover as the temperature is cooled to 150° C. the test ex HC pulse sample again exhibits a near instantaneous decrease to 0% CO conversion, while for the ex CO pulse test again shows the propagation of exotherm/deactivation front through the core before the catalyst is quenched, consistent with FIG. 3 and the mechanism proposed therein. The performance of Catalyst C is even better. Thus at 160° C., the sample was found to be robust to both CO and HC pulses, maintaining 100% CO conversion and an inlet of 150° C. was required to 'quench' the sample. A further interesting feature is noted during the HC pulse test. As the sample is cooled to 150° C., the onset of deactivation is seen but as soon as the HC pulse is introduced CO oxidation is somewhat stabilised, concomitant with a bed exotherm. However as soon as the HC pulse is ceased complete deactivation occurs. This phenomenon of metastable activity promoted by the exothermic combustion of HC species has previously been noted for HC DeNOx over Pt—$Al_2O_3$ (R. Burch, P. Fornasiero, and B. W. L. Southward, J. Catal. 182 (1999) p 234). Additionally, it is noted this sample contains zeolite in both layers yet gave superior performance, in contrast to the teachings of US2008/0045405 A1.

The promising SGB performance of the new generation designs are further confirmed in engine dynamometer, (hereafter dyno), aging and testing trials (FIG. 8). Herein the samples were tested fresh, ex dyno aged at 650° C. in full reactive gas flow for 20 h and ex 100 post injection/filter regeneration aging cycles (in the filter regeneration cycle the part is heated for 10 min at 600° C. inlet via appropriate engine set-up, then the engine is switched to a second setpoint to give a catalyst inlet temperature of 400° C. and post-injected fuel is introduced for 10 minutes to give a bed temperature of 750° C.). The data obtained from these tests show superior performance for catalysts B, C and D versus the reference. Hence after a typical non-filter/Euro 4 type application aging the parts show a 7-9° C. lower $T_{50}$ while after the typical Euro 5 filter aging and light-off test the benefits increase to 9-14° C. Moreover the data re-confirm that the new generation technology offers an especial benefit under more demanding, i.e. higher CO and HC concentrations, light-off conditions as typical for Euro 5 and beyond engine applications.

FIG. 9 compares the dyno aging and testing performance of the commercial DOC 120 gcf @ 3:1 versus two further layered DOC technologies E and F. In this instance the samples were aged by standard DPF regeneration or by aggressive DPF regeneration (with 400° C. catalyst inlet and 850° C. catalyst bed temperature during post injection). The latter DOCs are equivalent with respect to PGM load and type (160 gcf @ 1:1.13), base metal components and base metal loads. The only difference in the latter parts is that the 2 layer system employed therein is reversed. Hence catalyst F follows the new generation design i.e. more conventional Pt-Pd layer in the undercoat and a Pd-only (Pd-rich) layer in the overcoat, while in catalyst E the layers are reversed. This reversing of layers results in a profound change in the activity of the catalyst. Hence catalyst E exhibits at best equal or worse activity than the reference, consistent with previous experience and expectations of the PGM type and load employed while catalyst F maintains the unexpected benefits of the next generation design. These findings highlight the specific synergy of this two layer system and further confirm the novel discovery of this invention. Hence the performance data for catalyst F, and the various other examples disclosed herein, are surprising and quite contrary to the examples and teachings of US2008/0045405 A1.

The enhanced performance obtained with this new DOC design is possible with a range of Pt:Pd ratios. Preferably the Pt:Pd ratio of the undercoat is from about 20:1 to about 1:2 and the Pt:Pd ratio of the overcoat is from about 2:3 to about 0:1. Thus catalysts G, H and J all offer competitive performance versus the commercial DOC reference, as shown in the dyno performance summary in FIG. 10. It should be stressed that in all cases the performance is equal, or typically better, whilst offering PGM savings of 2.84, 2 and 4.88% respectively. It should also be stressed that the performance benefits realised are increasingly large after DPF regeneration aging and especially for light-off activity using emission and flow conditions typical of Euro 5 applications (2250 ppm CO, 750 ppm HC (C1), 50 ppm NOx, GHSV ca. 100,000 h−1).

FIG. 11 compares vehicle performance data for the DOC parts of FIG. 10. This testing on a typical Euro 4 engine confirms the benefits seen on the dyno. All test parts offer equal, or better, activity with up >10% decrease in CO emissions seen for Catalysts G and H. In all cases the benefits are ascribed to superior EUDC performance i.e. better light-off and increased tolerance to quenching from HC poisons.

The impact of PGM distribution at equal PGM type and cost is examined in FIG. 12. The data shows significant differences in activity versus metal placement. Hence catalyst ranking with lower CO $T_{50}$ being preferred, follows K<ref <L=M. This reflects the general quench resistance of the catalysts. In the case of catalyst K, it appears that the relatively high Pt load in pass 2, coupled with the lower zeolite content, results in the catalyst behaving in a manner more typical of a conventional DOC i.e. quench tolerance is lost. This issue may be addressed by either decreasing the Pt content in pass 2 (Catalyst L), or by significantly increasing the zeolite content in both layers, thereby enhancing HC scavenging but only at increased cost and total backpressure penalty (pressure drop and performance loss). Thus the data again confirm that for optimal performance high Pd/low Pt contents are favoured in pass 2, again contrary to the findings of US2008/0045405 A1.

FIG. 13 examines the potential for applying the second layer of the quench resistant DOC as a partial or zone pass. Additionally it reports the performance for a series of parts wherein Pd is again 'thrifted' from the second pass and moved into the first. The data suggest that by zone coating, again in combination with the type of higher zeolite contents as employed in FIG. 13, it becomes possible to increase the Pt:Pd ratio in the second layer (zone) without the adverse effects noted previously. Thus parts N, O and P display equivalent performance. Note no comparison is drawn here versus the reference since the PGM cost of the test parts is too high for meaningful comparison.

The effectiveness of zone coating of the second layer are further confirmed in FIG. 14 which reports vehicle performance data for three DOCs tested after 70 h of post injection aging performed at a major OEM. The three DOCs comprise an internal OEM reference versus a conventional DOC 70 gcf @ 3:2 (catalyst Q) and zone coated quench resistant DOC also 70 gcf @ 3:2 (Catalyst R). The data show again a clear performance benefit for the new generation DOC which provides 79% CO and 86% HC conversion respectively over the NEDC cycle for a vehicle with comparatively cool engine out temperatures (average 150° C. for first 800 s) consistent with the enhanced light-off and decreased 'quenching' of the new generation design.

FIGS. 15A/B and 16A/B show the SGB performance data after increasingly severe hydrothermal oven aging cycles for two commercial DOCs 150 gcf @ 4:1 versus the new generation DOC 210 @ 1:1.10. Samples were tested as cores 2.22 cm*2.54 cm after aging at 700° C., 25 hours, 10% steam, air and 800° C., 25 hours, 10% steam, air. Two SGB test protocols were employed to further differentiate the impact of HC concentration and speciation on performance. The first test conditions were selected to mimic a Euro V exhaust and comprised 1000 ppm CO, 600 ppm C1 n-Octane, 180 ppm C1 Methyl-Benzene, 75 ppm C1 Propene, 75 ppm C1 Methane, 80 ppm NO, 3 ppm $SO_2$, 3.5% $CO_2$, 13% $O_2$, 3.5% $H_2O$, balance $N_2$ and total flow 5 l/min with ramp from 50 to 300° C. at 10° C./min (hereafter complex HC mix test). The second set of test conditions were more typical 'SGB' conditions, employing only light HC species and comprised 350 ppm CO, 120 ppm $H_2$, 90 ppm C1 propene, 180 ppm C1 propane, 2 ppm $SO_2$, 270 ppm NO, 6% $O_2$, 10.7% $CO_2$, 3.5% $H_2O$ and balance $N_2$ and total flow 5 l/min with ramp from 100 to 400° C. at 15° C./min (hereafter C3 only HC mix test). The performance of the cores in the complex HC mix test both suggest the robustness of all DOCs to low levels of SOx poisoning but also re-confirm the CO light-off benefit for the new generation DOC, the benefit again being seen to increase with increasing severity of the aging cycle. In contrast HC performance is seen to follow a different trend with Catalyst T demonstrating the highest average HC conversion after 700° C. However after 800° C. aging the performance of Catalyst U is again the best. This data are consistent with the zeolite content of the technologies, Catalyst T containing >40% higher zeolite load which provides effective HC trapping under mild aging but suffers a significant decrease in trapping capacity after the harsher aging. Comparison with the C3 only test presents a somewhat different view. In this instance the choice of HC removes the possible impact of zeolite on HC and total performance. Hence under these conditions Catalyst U displays extremely strong performance under all aging conditions, with $T_{50}$ benefits of ca. 20° C. under both aging conditions. Moreover HC performance is also good and shows little, if any, change between the 700 and 800° C. aging cycles. This is ascribed to the capability of the hydrothermally durable Pd only pass 2 to facilitate high conversion of especially propane at lower temperatures, this capability not being provided by the conventional designs. This observation is again contrary to the claims of US2008/0045405 A1 wherein it is claimed "Pd containing DOCs may poison the activity of Pt to convert paraffins .". Indeed the data herein not only does not show any poisoning of Pt by Pd, but it rather shows that Pd and not Pt is the active metal for the oxidation of propane (paraffin).

A further differentiation between conventional DOCs and the new generation technology may be found by comparing FIG. 17 and FIG. 18 wherein the effect Pt:Pd ratio on performance is examined. In FIG. 17 the activity of commercial DOCs at equal PGM content but differing Pt:Pd ratio (120 @ 3:1 versus 120 @ 2:1) are shown. In this instance decreased Pt and increased Pd content correlates with increasing light-off temperatures and HC weaker oxidation performance. Moreover, the 2:1 DOC also exhibits a more severe deactivation profile with the performance gap being increasingly large with harsher aging. In addition it should be noted that the recovery of the technology after SOx aging is particularly weak. These trends are reflected in a comparison of HC performance. In conclusion the DOC exhibits exactly the kind of weaknesses associated with increased Pd content in a conventional DOC design, as outlined in US2008/0045405 A1. Thus, the performance data in FIG. 18 are in even more marked contrast. Herein the fresh and 800 air/steam oven aged performance of three next generation quench resistant DOCs are compared. Testing was performed on a drilled core (1"*3") in the SGB using a matrix of 400 ppm CO (std CO) or 1200 ppm CO (hi CO), 150 ppm C1 propene/propane (3:1) or 450 ppm C1 (hi HC), 12% $O_2$, 150 ppm NO, 5% $CO_2$, 5% $H_2O$ and balance $N_2$ at a total flow 30 l/min, ramp 75-325° C. at 15° C./min. The DOCs again employ the same total PGM content but at different Pt: Pd ratios (120 gcf @ 2:1, 1:1 and 1:2). However in this instance one does not see the same decrease in activity with increased Pd content. Indeed the performances of the 2:1 and 1:1 technologies, fresh and aged, and under conditions of low CO, high CO or high HC are within a few degrees. Indeed after aging the light-off temperatures are within experimental error and likely reflect the intrinsic activity of the pass 1 washcoats and that the PGM content of the pass 2 is still sufficient to scavenge the transient toxic HC species believed to be responsible for inhibition of light-off. The performance of the 1:2 is somewhat weaker but after aging it is still quite competitive, particularly given that this technology represents a PGM saving of 35%. In conclusion the primary observation within these data is atypical response with respect to PGM ratio and that high Pd content DOCs can provide competitive and equal performance to high Pt DOCs by utilisation of the quench resistant layered design, in contrast to preceding work e.g. US2008/0045405 A1.

It should be further noted that the terms "first", "second" and the like herein do not denote any order of importance, but rather are used to distinguish one element from another, and the terms "a" and "an" herein do not denote a limitation of quantity, but rather denote the presence of at least one of the referenced items. Furthermore, all ranges disclosed herein are inclusive and combinable (e.g., ranges of "up to about 25 weight percent (wt. %), with about 5 wt. % to about 20 wt. % desired, and about 10 wt. % to about 15 wt. % more desired" is inclusive of the endpoints and all intermediate values of the ranges, e.g. "about 5 wt. % to about 25 wt. %, about 5 wt. % to about 15 wt. %" etc.

In one embodiment, a catalytic device can comprise a housing disposed around a substrate with a compression ignition oxidation catalyst disposed at the substrate. Also, the method for treating a compression ignition exhaust stream can comprise: introducing a diesel exhaust stream to a compression ignition oxidation catalyst; and oxidising an exhaust stream component.

The catalyst materials are included in the formulation by combining alumina, or other appropriate support, with other catalyst materials to form a mixture, drying (actively or passively), and optionally calcining. More specifically, a slurry can be formed by combining alumina and water, and optionally pH control agents (such as inorganic or organic acids and bases) and/or other components. The catalytic materials (e.g. catalytic metals, such as Pt), can be added as salt(s) (e.g. inorganic salts and/or organic salts). This slurry can then be washcoated onto a suitable substrate. The washcoated product can be dried and heat treated to fix the washcoat onto the substrate.

The catalyst can further comprise a zeolite. Possible zeolites include Y-type zeolite, beta (β) zeolite, ZSM-5, silica alumina phosphate (SAPO e.g. SAPO34) and the like, as well as combinations comprising at least one of the foregoing zeolites. The zeolite can, for example, have a silica to alumina ratio (Si:Al) of about 25 to about 80, or, more specifically, about 35 to about 60. If the zeolite is employed, it can be added to the slurry along with the catalytic material (e.g., before the catalytic material has been calcined).

This slurry can be dried and heat treated, e.g., at temperatures of about 500° C. to about 1,000° C., or more specifically about 500° C. to about 700° C., to form the finished catalyst formulation. Alternatively, or in addition, the slurry can be washcoated onto the substrate and then heat treated as described above, to adjust the surface area and crystalline nature of the support. Once the support has been heat treated, catalyst metals may optionally be disposed on the support. The catalyst metals, therefore, can be added after the washcoat is fixed onto the substrate by additional washcoat steps and/or by exposing the washcoated substrate to a liquid containing the catalytic metal.

The supported catalyst comprises a PGM (Pt, Pd, Rh etc.) or more preferred a combination of PGMs, (modified) alumina, and zeolite, and optionally oxygen storage (OS) material. The amounts of these components in the catalyst can be:

about 0.1 wt % to about 10 wt % PGM, about 50 wt % to about 80 wt % (modified) alumina, about 5 wt % to about 50 wt % OS, and about 10 wt % to about 50 wt % zeolite; or, more specifically, about 1 wt % to about 5 wt % PGM, about 40 wt % to about 60 wt % modified alumina, about 5 wt % to about 20 wt % of OS, and about 20 wt % to about 40 wt % zeolite.

The supported catalyst can be disposed on a substrate. The substrate can comprise any material designed for use in the desired environment, e.g., a compression ignition engine (e.g., a diesel engine) environment. Some possible materials include cordierite, silicon carbide, metal, metal oxides (e.g., alumina, and the like), glasses, and the like, and mixtures comprising at least one of the foregoing materials. These materials can be in the form of packing material, extrudates, foils, perform, mat, fibrous material, monoliths (e.g., a honeycomb structure, and the like), other porous structures (e.g., porous glasses, sponges), foams, molecular sieves, and the like (depending upon the particular device), and combinations comprising at least one of the foregoing materials and forms, e.g., metallic foils, open pore alumina sponges, and porous ultra-low expansion glasses. Furthermore, these substrates can be coated with oxides and/or hexaaluminates, such as stainless steel foil coated with a hexaaluminate scale.

Although the substrate can have any size or geometry, the size and geometry are preferably chosen to optimise geometric area in the given exhaust emission control device design parameters. Typically, the substrate has a honeycomb geometry, with the combs through-channel having any multi-sided or rounded shape, with substantially square, triangular, pentagonal, hexagonal, heptagonal, or octagonal or similar geometries preferred due to ease of manufacturing and increased surface area.

Once the supported catalytic material is on the substrate, the substrate can be disposed in a housing to form the converter. The housing can have any design and comprise any material suitable for the application. Suitable materials for the housing can comprise metals, alloys, and the like, such as ferritic stainless steels (including stainless steels such as, e.g., the 400-Series such as SS-409, SS-439, and SS-441), and other alloys (e.g. those containing nickel, chromium, aluminium, yttrium and the like, e.g., to permit increased stability and/or corrosion resistance at operating temperatures or under oxidising or reducing atmospheres).

Also similar materials as the housing, end cone(s), end plate(s), exhaust manifold cover(s), and the like, can be concentrically fitted about the one or both ends and secured to the housing to provide a gas tight seal. These components can be formed separately (e.g., moulded or the like), or can be formed integrally with the housing using methods such as, e.g., a spin forming, or the like.

Disposed between the housing and the substrate can be a retention material. The retention material, which may be in the form of a mat, particulates, or the like, may be an intumescent material e.g., a material that comprises vermiculite component, i.e., a component that expands upon the application of heat, a non-intumescent material, or a combination thereof. These materials may comprise ceramic materials e.g., ceramic fibres and other materials such as organic and inorganic binders and the like, or combinations comprising at least one of the foregoing materials.

Thus, the coated monolith containing the high Pd-content layered DOC is incorporated into the exhaust flow of the compression ignition engine. This provides a means for treating said compression ignition exhaust stream to reduce the concentrations of environmental toxins by passing said diesel exhaust stream over the aforementioned compression ignition oxidation catalyst under net oxidising conditions (oxygen rich) to facilitate catalytic conversion/oxidation into more environmentally benign products.

The above-described catalyst and process and other features will be appreciated and understood by those skilled in the art from the detailed description, drawings, and appended claims.

EXAMPLES

The procedure for making Part A, is as follows: Slurry Alumina at pH ca. 4.5 and mill to $d_{50}$ (diameter of 50% of the particles) of 4±0.5 microns, confirm $d_{90}$. Add required β40 as powder, correct for loss on ignition (LOI), to slurry. Re-mill combined slurry to maintain $d_{50}$, if required. Next take the required concentration of Pt nitrate solution and slowly dilute with appropriate rheology modifier as required prior to adding solution dropwise to milled slurry. Slurry must be at a pH lower than 6.0 prior to metal addition and during Pt addition, monitor pH and prevent slurry from going to pH values below 3.0 with the judicious use of base. After metal addition, adjust to 3.5 with base and stir slurry for two hours. Next add the required concentration of Pd Nitrate solution drop-wise, again during metal addition, monitor pH and prevent slurry from going to pH values below 3.0 with the judicious use of base. Stir resultant mixture for one hour to allow full chemisorption of metal. Then coat monolith in 1 pass and calcine at temperatures $\geq 540°$ C. for $\geq 1$ hour. Pass 2: Add Barium salt to deionised water and required rheology pH modifiers, then add OS component and mix. Next slowly add Alumina, with vigorous mixing and then mill resultant slurry to $d_{50}$ of 6-8 microns, $d_{90}$ of 20-25 microns and 100% pass <60 microns. Add the β40 powder, correct for LOI, with minimal D.I. water to maintain slurry rheology and viscosity. Lightly mill resultant slurry to maintain $d_{50}$, $d_{90}$, $d_{100}$, as required. Weigh the slurry and determine LOI, from this calculate required PGM mass. Adjust slurry pH to 5-6 prior to PGM addition. Add Palladium Nitrate solution to slurry vortex over 30 minutes, prevent slurry from reaching pH values of less than 3 by judicious use of base. Stir for 2 hours to allow full chemisorption of Pd. Next add Rh nitrate dropwise to slurry vortex, again prevent pH from going below 3 with base. Stir 1 hour. Check specific gravity and pH and adjust to facilitate coating in one pass. Then coat monolith in 1 pass and calcine at temperatures $\geq 540°$ C. for $\geq 1$ hour.

The procedure for making Part B entails the following: Slurry SCFA-90 at pH ca. 4.5 and mill to $d_{50}$ of 4±0.5 microns, confirm $d_{90}$. Next take the required concentration of Pt nitrate solution and slowly dilute with appropriate rheology modifier as required prior to adding solution dropwise to slurry. Slurry must be at a pH lower than 6.0 prior to metal addition and during Pt addition, monitor pH and prevent pH from going to values below 3.0 with the judicious use of base. After metal addition, adjust to 3.5 with base and stir slurry for two hours. Next add the required concentration of Pd Nitrate solution dropwise, again during metal addition, monitor pH and prevent slurry from going to pH values below 3.0 with the judicious use of base. Stir resultant mixture for one hour to allow full chemisorption of metal. Then coat monolith in 1 pass and calcine at temperatures $\geq 540°$ C. for $\geq 1$ hour. Pass 2: Add Barium salt to deionised water and required rheology pH modifiers and mix. Next slowly add HP14/150 Zr 5 Alumina, at 20<T<25° C. with vigorous mixing and then mill resultant slurry to $d_{50}$ of 5-6 microns, confirm $d_{90}$ and 100% pass. Add the β40 powder, correct for LOI, with minimal D.I. water to maintain slurry rheology and viscosity. Lightly mill resultant slurry to maintain $d_{50}$, $d_{90}$, $d_{100}$, as required. Weigh the slurry and determine LOI, from this calculate required PGM mass. Adjust slurry pH to 5-6 prior to PGM addition. Add Palladium Nitrate solution to slurry vortex over 30 minutes, maintain slurry at pH>3 by judicious use of base. Stir for 3 hours to allow chemisorption of Pd. Confirm and adjust specific gravity and pH to facilitate one pass coating. Coat monolith and calcine at $\geq 540°$ C. for $\geq 1$ hour.

The procedure for making Part C, as employed as a test technology is as follows: Slurry Alumina at pH ca. 4.5 and mill to $d_{50}$ of 4±0.5 microns, confirm $d_{90}$. Add the β40 powder, correct for LOI, with minimal D.I. water to maintain slurry rheology and viscosity. Lightly mill resultant slurry to maintain $d_{50}$, $d_{90}$, $d_{100}$, as required. Next take the required concentration of Pt nitrate solution and slowly dilute with appropriate rheology modifier as required prior to adding solution dropwise to milled Alumina slurry. Slurry must be at a pH lower than 6.0 prior to metal addition and during Pt addition, monitor pH and prevent slurry from going to pH values below 3.0 with the judicious use of base. After metal addition, adjust to 3.5 with base and stir slurry for two hours. Next add the required concentration of Pd Nitrate solution dropwise, again during metal addition, monitor pH and prevent slurry from going to pH values below 3.0 with the judicious use of base. Stir resultant mixture for one hour to allow for fall chemisorption of metal. Then coat monolith in 1 pass and calcine at temperatures $\geq 540°$ C. for $\geq 1$ hour. Pass 2: Add Barium salt to deionised water and required rheology pH modifiers and mix. Next slowly add Alumina, at 20<T<25° C. with vigorous mixing and then mill resultant slurry to $d_{50}$ of 5-6 microns, confirm $d_{90}$ and 100% pass. Add the β40 powder, correct for LOI, with minimal D.I. water to maintain slurry rheology and viscosity. Lightly mill resultant slurry to maintain $d_{50}$, $d_{90}$, $d_{100}$, as required. Weigh the slurry and determine LOI, from this calculate required PGM mass. Adjust slurry pH to 5-6 prior to PGM addition. Add Palladium Nitrate solution to slurry vortex dropwise, prevent slurry pH values of <3 by judicious use of base. Stir for 3 hours to allow chemisorption of Pd. Check specific gravity and pH and adjust to facilitate coating. Coat monolith and calcine at temperatures $\geq 540°$ C. for $\geq 1$ hour.

The procedure for making Part G, is as follows: Slurry Alumina at pH of 3.5-5 and mill to $d_{50}$ of ±10.5 microns, confirm $d_{90}$. Add the β40 powder, correct for LOI, with minimal D.I. water to maintain slurry rheology and viscosity. Lightly mill resultant slurry to maintain $d_{50}$, $d_{90}$, $d_{100}$, as required. Take the required concentration of Pt nitrate and dilute with appropriate rheology modifier as required prior to adding dropwise to milled Alumina slurry. Slurry must be at a pH <6.0 prior to metal add and during Pt addition, monitor pH and prevent slurry from going to pH values below 3.0 with the judicious use of base. After metal addition, adjust to 3.5 with base and stir for two hours. Next add Pd Nitrate solution dropwise, again during metal addition, monitor pH and prevent slurry from going to pH values below 3.0 with the judicious use of base. Stir for one hour for full chemisorption. Then coat monolith in 1 pass and calcine at $\geq 540°$ C. for $\geq 1$ hour. Pass 2: Add Barium salt to deionised water and any required rheology/pH modifiers and mix. Next slowly add MI-386, at 20<T<25° C. with vigorous mixing and mill resultant slurry to $d_{50}$ of 5-6 microns, confirm $d_{90}$ and 100% pass. Add La salt and the β 40 powder, correct for LOI, with minimal D.I. water to maintain slurry rheology and viscosity. Lightly mill resultant slurry to maintain $d_{50}$, $d_{90}$, $d_{100}$, as required. Weigh the slurry and determine LOI, from this calculate required PGM mass. Adjust slurry pH to 5-6 prior to PGM addition. Add Palladium Nitrate solution to slurry vortex over 30 minutes, prevent slurry from reaching pH values of less than 3 by judicious use of base. Stir for 2-3 hours to allow fall chemisorption of Pd. Check specific gravity and pH and adjust to facilitate coating in one pass. Then coat monolith in 1 pass and calcine at temperatures $\geq 540°$ C. for $\geq 1$ hour.

The procedure for making Part R, as submitted in OEM test trials: First prepare the 'white' washcoat master batch i.e. complete batching of metal oxide components. Add HP14/150 Zr Alumina, with constant mixing, at 15<T<25° C. to deionised water containing any required rheology and pH modifiers to maintain pH of 4.5 and a smooth flowing slurry. During the addition it may be necessary to begin milling to ensure slurry maintains free flowing characteristics. Mill to $d_{50}$ of 6-8 microns, $d_{90}$ of 20-25 and 100% pass <60 microns. Add β40 powder, correct for LOI, with minimal D.I. water to maintain slurry rheology and viscosity. Lightly mill resultant slurry to maintain $d_{50}$, $d_{90}$, $d_{100}$, as required. Split slurry into two batches for pass 1 and 2. Pass 1—Take Pt nitrate and slowly dilute with appropriate rheology modifiers as required prior to adding solution dropwise to milled alumina slurry. Slurry must be at a pH lower than 6.0 prior to metal addition and during Pt addition, monitor pH and prevent slurry from going to pH values below 3.0 with the judicious use of base. After metal addition, adjust to a pH of 3.5 with base and stir slurry for two hours. Examine $d_{50}$, $d_{90}$ and $d_{100}$ to confirm no agglomeration of PGM has occurred. Next add the required concentration of Pd Nitrate solution dropwise, again during metal addition, monitor pH and prevent slurry from going to pH values below 3.0 with the judicious use of base. Stir resultant mixture for one hour to allow full chemisorption of metal. Adjust pH of slurry to 3-3.5 and coat monolith in 1 pass and calcine at temperatures $\geq 540°$ C. for $\geq 1$ hour. Pass 2: Add Barium salt to master slurry and mix. Weigh the slurry and determine LOI, from this calculate required PGM mass. Adjust slurry pH to 5-6 prior to PGM addition. Take the required concentration of Pt nitrate solution and slowly dilute with appropriate rheology modifiers as required prior to adding solution dropwise to milled Alumina slurry. Slurry must be at a pH lower than 6.0 prior to metal addition and during Pt addition, monitor pH and prevent slurry from going to pH values below 3.0 with the judicious use of base. After metal addition, adjust to a pH of 3.5 with base and stir slurry for two hours. Examine $d_{50}$, $d_{90}$ and $d_{100}$ to confirm no agglomeration of PGM has occurred. Next add the required concentration of Pd Nitrate solution dropwise, again during metal addition, monitor pH and prevent slurry from going to pH values below 3.0 with the judicious use of base. Stir resultant mixture for three hours to allow full chemisorption of metal. Re-confirm $d_{50}$, $d_{90}$, $d_{100}$. Adjust pH of slurry to 3-3.5 and coat monolith in 1 pass using appropriate piston or other metered charge coater along 75% of length of part and calcine at temperatures $\geq 540°$ C. for $\geq 1$ hour.

The procedure for making Parts X, Y and Z, as employed as test technologies is as follows: First prepare the 'white' washcoat master batch i.e. complete batching of metal oxide components. Add alumina, with constant mixing, at 15<T<25° C. to deionised water containing any required rheology and pH modifiers to maintain pH of 4.5. Mill to $d_{50}$ of 6-8 microns, $d_{90}$ of 20-25 and 100% pass <60 microns. Add the β40 powder, correct for LOI, with minimal D.I. water to maintain slurry rheology and viscosity. Lightly mill resultant slurry to maintain $d_{50}$, $d_{90}$ and $d_{100}$, as required. Split slurry into two batches for pass 1 and 2. Pass 1—take the required concentration of Pt nitrate solution and slowly dilute with appropriate rheology modifiers as required prior to adding solution dropwise to milled Alumina slurry. Slurry must be at a pH lower than 6.0 prior to metal addition and during Pt addition, monitor pH and prevent slurry from going to pH values below 3.0 with the judicious use of base. After metal addition, adjust to a pH of 3.5 with base and stir slurry for two hours. Examine $d_{50}$, $d_{90}$ and $d_{100}$ to confirm no agglomeration of PGM has occurred. Next add the required concentration of Pd Nitrate solution dropwise, again during metal addition, monitor pH and prevent slurry from going to pH values below 3.0 with the judicious use of base. Stir resultant mixture for one hour to allow fall chemisorption of metal. Adjust pH of slurry to 3-3.5 and coat monolith in 1 pass and calcine at temperatures ≧540° C. for ≧1 hour. Pass 2: Add Barium salt to master slurry and mix. Weigh the slurry and determine LOI, from this calculate required PGM mass. Adjust slurry pH to 5-6 prior to PGM addition. Take the required concentration of Pt nitrate solution and slowly dilute with appropriate rheology modifiers as required prior to adding solution dropwise to milled Alumina slurry. Slurry must be at a pH lower than 6.0 prior to metal addition and during Pt addition, monitor pH and prevent slurry from going to pH values below 3.0 with the judicious use of base. After metal addition, adjust to a pH of 3.5 with base and stir slurry for two hours. Examine $d_{50}$, $d_{90}$ and $d_{100}$ to confirm no agglomeration of PGM has occurred. Next add the required concentration of Pd Nitrate solution dropwise, again during metal addition, monitor pH and prevent slurry from going to pH values below 3.0 with the judicious use of base. Stir resultant mixture for three hours to allow full chemisorption of metal. Re-confirm $d_{50}$, $d_{90}$ and $d_{100}$. Adjust pH of slurry to 3-3.5 and coat monolith in 1 pass using appropriate piston or other metered charge coater along 50% of length of part and calcine at temperatures ≧540° C. for ≧1 hour.

DOC Monolith Key for Figures: n.b. Pass 1=undercoat PtPd 120 @ 3:1 reference: 103.7 g/l SCFA-90 30 Pt 90 Pt 36.6 g/l β zeolite SAR 40

A: Pass 1—79.43 g/l SCFA-90 17 gcf Pd 51 gcf Pt 12.22 g/l β-40
  Pass 2—61.1HP14/150 Zr5 7.6Ba 60 gcf Pd 6 gcf Rh 15.3 β-40 5.3CeZrLaPrO$_2$
B: Pass 1—91.5 SCFA-90 25 gcf Pd 75 gcf Pt
  Pass 2—61 HP14/150-Zr5 7.9 Ba 60 gcf Pd 27.45 β-40
C: Pass 1—91.5 SCFA-90 25 gcf Pd 75 gcf Pt 13.725 β-40
  Pass 2 61 HP14/150-Zr5 7.9 Ba 60 gcf Pd 13.725 β-40
D: Pass 1—91.5 SCFA-90 25 gcf Pd 75 gcf Pt 13.725 β-40
  Pass 2—61 HP14/150-La4 7.9 Ba 60 gcf Pd 13.725 β-40
E: Pass 1—61.1 MI-386 7.9 Ba 60 gcf Pd 0.02 La$_2$O$_3$
  Pass 2—91.65 SCFA-90 25 gcf Pd 75 gcf Pt 27.5 β-40
F: Pass 1—91.65 SCFA-90 25 gcf Pd 75 gcf Pt 27.5 β-40
  Pass 2—61.1 MI-386 7.9 Ba 60 gcf Pd 0.02 La$_2$O$_3$
G: Pass 1—91.5 SCFA-90 25 gcf Pd 75 gcf Pt 12.2 β-40
  Pass 2—61.1 MI-386 7.9 Ba 60 gcf Pd 0.02 La2O3 12.2 β-40
H: Pass 1—91.5 SCFA-90 27 gcf Pd 81 gcf Pt
  Pass 2—61.1 MI-386 7.9 Ba 35 gcf Pd 0.02 La2O3 27.45 β-40
J: Pass 1—91.5 SCFA-90 22 gcf Pd 66 gcf Pt
  Pass 2—61.1 MI-386 7.9 Ba 95 gcf Pd 0.02 La2O3 27.45 β-40
K: Pass 1—91.5 SCFA-90 25 gcf Pd 50 gcf Pt 13.725 β-40
  Pass 2—61.1 HP14/150 Zr5 7.9 Ba 60 gcf Pd 25 gcf Pt 13.725 β-40
L: Pass 1—91.5 SCFA-90 25 gcf Pd 65 gcf Pt 13.725 β-40
  Pass 2—61.1 HP14/150 Zr5 7.9 Ba 60 gcf Pd 10 gcf Pt 13.725 β-40
M: Pass 1—80.825 SCFA-90 25 gcf Pd 50 gcf Pt 21.35 β-40
  Pass 2—61.1 HP14/150 Zr5 7.9 Ba 60 gcf Pd 25 gcf Pt 16.775 β-40
N: Pass 1—91.5 HP14/150 Zr5 40 gcf Pd 80 gcf Pt 32.33 β-40
  Zone Pass 2—49.4 HP14/150 Zr5 7.9 Ba 52 gcf Pd 16 gcf Pt 17.446 β-40 50%
O: Pass 1—91.5 HP14/150 Zr5 54 gcf Pd 80 gcf Pt 32.33 β-40
  Zone Pass 2—49.4 HP14/150 Zr5 7.9 Ba 24 gcf Pd 16 gcf Pt 17.446 β-40 50%
P: Pass 1—91.5 HP14/150 Zr5 58 gcf Pd 80 gcf Pt 32.33 β-40
  Zone Pass 2—49.4 HP14/150 Zr5 7.9 Ba 16 gcf Pd 16 gcf Pt 17.446 β-40 50%
Q: Commercial sample—base metal components not analysed
R: Pass 1—91.65 HP14/150 Zr5 17 gcf Pd 40 gcf Pt 32.383 β-40
  Zone Pass 2—49.49 HP14/150 Zr5 14.667 gcf Pd 2.667 gcf Pt 17.47 β-40 75%
S: Commercial sample—base metal components not analysed
T: 134.2 SCFA-90 30 Pd 123 Pt 48.8 β-40
U: Pass 1—91.5 SCFA-90 30 gcf Pd 100 gcf Pt 13.725 β-40
  Pass 2—61 HP14/150 Zr5 7.9 Ba 80 gcf Pd 13.725 β-40
V: 103.7 SCFA-90 40 Pd 80 Pt 36.6 β-40
W: Pass 1—82.5 HP14/150 Zr5 30 gcf Pd 75 gcf Pt 29.1 β-40
  Zone Pass 2 49.4 HP14/150 Zr5 1.2Ba 20 gcf Pd 10 gcf Pt 17.47 β-40 50%
X: Pass 1—82.5 HP14/150 Zr5 50 gcf Pd 55 gcf Pt 29.1 β-40
  Zone Pass 2—49.4 HP14/150 Zr5 1.2 Ba 20 gcf Pd 10 gcf Pt 17.47 β-40 50%
Y: Pass 1—82.5 HP14/150 Zr5 10 gcf Pd 35 gcf Pt 29.1 β-40
  Zone Pass 2—49.4 HP14/150 Zr5 1.2 Ba 20 gcf Pd 10 gcf Pt 17.47 β-40 50%

While the invention has been described above with reference to exemplary embodiments, it will be understood by those skilled in the art that various changes may be made and equivalents may be substituted for elements thereof without departing from the scope and the general principle of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An oxidation catalyst, for the remediation of pollutants from the exhaust of a compression ignition engine comprising a carrier or substrate upon which is disposed at least two layers of washcoat wherein:
   a) a first layer or undercoat comprises palladium and platinum, a refractory oxide support, optionally a zeolite, and optionally an oxygen storage material,
   b) a second layer or overcoat comprises palladium and platinum in amounts which give a Pt:Pd ratio of about 0:1 to about 2:3, and a refractory oxide support, optionally a zeolite, and optionally an oxygen storage material, wherein the Pt to Pd ratio of the overcoat is less than the Pt to Pd ratio of the undercoat.

2. The catalyst of claim 1, wherein the Pt:Pd ratio of the undercoat is from about 1:2 to about 20:1.

3. The catalyst of claim 1, wherein the Pt:Pd ratio of the undercoat is about 1:1 and the Pt:Pd ratio of the overcoat is about 1:2.

4. The catalyst of claim 1, wherein the overcoat optionally contains rhodium.

5. The catalyst of claim 1, wherein the overcoat optionally contains a salt or oxide of barium.

6. The catalyst of claim 1, wherein the overcoat optionally contains a salt or oxide of lanthanum.

7. The catalyst of claim 1, wherein the refractory oxide support in the undercoat is a member selected from the group consisting of alumina, a modified or heteroatom doped alumina, zirconia or titania and mixtures thereof.

8. The catalyst of claim 1, wherein the refractory oxide support in the overcoat is a member selected from the group consisting of alumina, a modified or heteroatom doped alumina, zirconia or titania and mixtures thereof.

9. The catalyst of claim 1, wherein the refractory oxide support in the undercoat is a heteroatom doped alumina, wherein the heteroatom dopant is a member selected from the group consisting of Si, Fe, Zr, Ba, La and mixtures thereof.

10. The catalyst of claim 1, wherein the refractory oxide support in the overcoat is a heteroatom doped alumina, wherein the heteroatom dopant is a member selected from the group consisting of Si, Fe, Zr, Ba, La and mixtures thereof.

11. The catalyst of claim 1, wherein the zeolite in the undercoat is selected from the group consisting of Beta (β), Chabazite, Clinoptilolite, Faujasite, Ferrierite, Mordenite, Offretite, Silicalite, zeolite X, zeolite Y, Ultrastable zeolite Y, ZSM5, ZSM11, ZSM22, ZSM series material, structural isomorphs thereof and mixtures thereof.

12. The catalyst of claim 1, wherein the optional zeolite in the overcoat is selected from the group consisting of Beta (β), Chabazite, Clinoptilolite, Faujasite, Ferrierite, Mordenite, Offretite, Silicalite, zeolite X, zeolite Y, Ultrastable zeolite Y, ZSM5, ZSM11, ZSM22, other ZSM series material, structural isomorphs thereof and mixtures thereof.

13. The catalyst of claim 1, wherein the catalyst has an inlet and an outlet, and the overcoat is optionally applied to cover a length of the substrate of about 5% to about 75% from the inlet.

14. The catalyst of claim 1, wherein the catalyst has an inlet and an outlet, and the undercoat is optionally applied to cover a length of the substrate of about 95% to about 25% from the inlet.

15. The oxidation catalyst of claim 1, wherein the undercoat, the overcoat, or both, further comprises iridium, rhodium, ruthenium, alloys thereof, and mixtures thereof.

16. A diesel oxidation catalyst comprising a substrate and a washcoat wherein the catalyst has an inlet and an outlet, wherein a first washcoat zone is applied to cover a length of the substrate of about 25% to about 95% from the inlet and the first washcoat zone contains Pt:Pd at a ratio of about 0:1 to about 2:3 and a second washcoat zone is applied to cover a length of about 5% to about 75% from the outlet and the second washcoat zone contains Pt:Pd at a ratio of about 1:2 to about 20:1.

17. The diesel oxidation catalyst of claim 16, wherein the first washcoat zone, the second washcoat zone, or both, further comprises iridium, rhodium, ruthenium, alloys thereof, and mixtures thereof.

18. A method of treating exhaust gas comprising passing an exhaust gas over a catalytic device, comprising:
a housing disposed around a substrate;
an oxidation catalyst for the remediation of pollutants from the exhaust of a compression ignition engine comprising a carrier or substrate upon which is disposed at least two layers of washcoat wherein:
a) a first layer or undercoat comprises palladium and platinum, a refractory oxide support, optionally a zeolite, and optionally an oxygen storage material,
b) a second layer or overcoat comprises palladium and platinum in amounts which give a Pd:Pt ratio of about 0:1 to about 2:3, and a refractory oxide support, optionally a zeolite, and
wherein the Pt to Pd ratio of the overcoat is less than that of the undercoat.

19. The method of claim 18, wherein the catalytic device further comprising a retention material disposed between the housing and the substrate.

20. The method of claim 18, wherein the undercoat, the overcoat, or both further comprises iridium, rhodium, ruthenium, alloys thereof, and mixtures thereof.

21. A catalytic device for the remediation of pollutants from the exhaust of a compression ignition engine comprising:
a housing disposed around a substrate,
an oxidation catalyst, comprising a substrate upon which is disposed at least two layers of washcoat wherein:
a) a first layer or undercoat comprises palladium and platinum, a refractory oxide support, optionally a zeolite, and optionally an oxygen storage material,
b) a second layer or overcoat comprises palladium and platinum in amounts which give a Pt:Pd ratio of about 0:1 to about 2:3, and a refractory oxide support, optionally a zeolite, and optionally an oxygen storage material,
wherein the Pt to Pd ratio of the overcoat is less than the Pt to Pd ratio of the undercoat.

22. The catalytic device of claim 21, further comprising a retention material disposed between the housing and the substrate.

23. The catalytic device of claim 21, wherein the undercoat, the overcoat, or both further comprises iridium, rhodium, ruthenium, alloys thereof, and mixtures thereof.

24. A catalytic device for treating exhaust gas comprising:
a housing disposed around at least one substrate;
an oxidation catalyst, for the remediation of pollutants from the exhaust of a compression ignition engine comprising a first substrate located upstream with respect to flow of exhaust gas upon which is disposed a second substrate wherein:
a) the first substrate comprising palladium and platinum, a refractory oxide support, optionally a zeolite, and optionally an oxygen storage material,
b) the second substrate comprising palladium and platinum in amounts which give a Pt:Pd ratio of about 0:1 to about 2:3, and a refractory oxide support, optionally a zeolite, and optionally an oxygen storage material,
wherein the Pt to Pd ratio of the first substrate is less than the Pt to Pd ratio of the second substrate.

* * * * *